(12) United States Patent
Hosseini et al.

(10) Patent No.: US 11,606,814 B2
(45) Date of Patent: *Mar. 14, 2023

(54) UPLINK COLLISION HANDLING

(71) Applicant: QUALCOMM Incorporated, San Diego, CA (US)

(72) Inventors: Seyedkianoush Hosseini, San Diego, CA (US); Wei Yang, San Diego, CA (US); Peter Gaal, San Diego, CA (US); Yi Huang, San Diego, CA (US); Amir Aminzadeh Gohari, Sunnyvale, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 16/927,689

(22) Filed: Jul. 13, 2020

(65) Prior Publication Data
US 2020/0344805 A1 Oct. 29, 2020

Related U.S. Application Data

(62) Division of application No. 16/805,514, filed on Feb. 28, 2020, now Pat. No. 11,122,622.
(Continued)

(51) Int. Cl.
*H04W 74/08* (2009.01)
*H04W 72/10* (2009.01)
*H04L 1/1812* (2023.01)

(52) U.S. Cl.
CPC ....... *H04W 74/0808* (2013.01); *H04L 1/1812* (2013.01); *H04W 72/10* (2013.01);
(Continued)

(58) Field of Classification Search
CPC ............. H04W 74/0808; H04W 72/10; H04W 74/0816; H04W 74/0825; H04W 74/0858;
(Continued)

(56) References Cited

U.S. PATENT DOCUMENTS

| | | | |
|---|---|---|---|
| 2012/0127869 A1* | 5/2012 | Yin | H04W 28/06 370/252 |
| 2017/0013565 A1 | 1/2017 | Pelletier et al. | |

(Continued)

OTHER PUBLICATIONS

Frotzscher A., et al., "Requirements and Current Solutions of Wireless Communication in Industrial Automation", ICC'14—W8: Workshop on 5G Technologies, IEEE, 2014, pp. 67-72.
(Continued)

*Primary Examiner* — Ashley Shivers
(74) *Attorney, Agent, or Firm* — Qualcomm Incorporated

(57) ABSTRACT

Methods, systems, and devices are described for handling transmissions or channels in wireless communications that collide with one another. The described techniques relate to handling the collision between multiple overlapping channels (e.g., two or more channels of the same priority). For example, a collision resolution configuration may include resolving the collisions among the channels of the same priority first (e.g., feedback information transmissions first, and then control information), among the channels of the same service type first (e.g., normal channels first, and then low latency channel(s)), or across all of the channels of all priorities at once. Collisions may be resolved by dropping or rescheduling overlapping information from the lower priority transmission(s) or channel(s) in consideration of the higher priority transmission(s) or channel(s), or by multiplexing or piggybacking overlapping information from a first priority transmission(s) or channel(s) with a second priority transmission(s) or channel(s).

23 Claims, 17 Drawing Sheets

Related U.S. Application Data

(60) Provisional application No. 62/877,017, filed on Jul. 22, 2019, provisional application No. 62/848,520, filed on May 15, 2019, provisional application No. 62/826,634, filed on Mar. 29, 2019.

(52) U.S. Cl.
CPC ... *H04W 74/0816* (2013.01); *H04W 74/0825* (2013.01); *H04W 74/0858* (2013.01)

(58) Field of Classification Search
CPC ......... H04W 72/1284; H04W 72/0413; H04W 72/0446; H04W 72/0453; H04L 1/1812; H04L 1/1664; H04L 1/1854
See application file for complete search history.

(56) References Cited

U.S. PATENT DOCUMENTS

| | | | |
|---|---|---|---|
| 2017/0201308 A1* | 7/2017 | Park | H04W 16/14 |
| 2018/0331743 A1* | 11/2018 | Shen | H04B 7/0626 |
| 2019/0045546 A1 | 2/2019 | Li | |
| 2019/0215086 A1* | 7/2019 | Kwak | H04L 1/0693 |
| 2019/0215897 A1* | 7/2019 | Babaei | H04W 76/38 |
| 2019/0253207 A1* | 8/2019 | Li | H04W 72/0446 |
| 2020/0314900 A1 | 10/2020 | Hosseini et al. | |
| 2020/0367261 A1 | 11/2020 | Huang et al. | |

OTHER PUBLICATIONS

Catt: "Discussion on Intra-UE Multiplexing Scenarios", 3GPP Draft, 3GPP TSG RAN WG1 Ad-Hoc Meeting 1901, R1-1900337, Discussion on Intra-UE Multiplexing Scenarios, 3rd Generation Partnership Project (3GPP), Mobile Competence Centre, 650, Route Des Lucioles, F-06921, Sophia-Antipolis Cedex, France, vol. RAN WG1, No. Taipei; Jan. 21, 2019-Jan. 25, 2019, Jan. 20, 2019 (Jan. 20, 2019), XP051593251, 9 pages, Retrieved from the Internet: URL: http://www.3gpp.org/ftp/Meetings%5F3GPP%5FSYNC/RAN1/Docs/R1%2D1900337%2Ezip and URL:http://www.3gpp.org/ftp/Meetings%5F3GPP%5FSYNC/RAN1/Docs/R1%2D1900337%2Ezip[retrieved on Jan. 20, 2019] figures 1-4 sections 2-3.
Interdigital Inc: "URLLC UCI Prioritization", 3GPP Draft, R1-1811114, 3GPP TSG Ran WG1 Meeting #94 bis (R16 NR WI AI 7265 UCI for URLLC), 3rd Generation Partnership Project (3GPP), Mobile Competence Centre, 650, Route Des Lucioles, F-06921, Sophia-Antipolis Cedex, France vol. RAN WG1, No. Chengdu, China; Oct. 8, 2018-Oct. 12, 2018, Sep. 29, 2018 (Sep. 29, 2018), XP051518517, 2 Pages, Retrieved from the Internet: URL:http://www.3gpp.org/ftp/tsg%5Fran/WG1%5FRL1/TSGR1%5F94b/Docs/R1%2D1811114%2Ezip [retrieved on Sep. 29, 2018] The Whole Document.
International Search Report and Written Opinion—PCT/US2020/020674—ISA/EPO—dated Sep. 24, 2020.
NTT Docomo Inc: "UL Intra-UE Transmission Prioritization/Multiplexing",3GPP Draft, R1-1902810, 3GPP TSG RAN WG1 #96, URLLC UL Intra-UE, 3rd Generation Partnership Project (3GPP), Mobile Competence Centre, 650, Route Des Lucioles, F-06921 Sophia-Antipolis Cedex, France vol. RAN WG1, No. Athens, Greece; Feb. 25, 2019-Mar. 1, 2019, Feb. 16, 2019 (Feb. 16, 2019), XP051600505, 6 Pages, Retrieved from the Internet: URL:http://www.3gpp.org/ftp/tsg%5Fran/WG1%5FRL1/TSGR1%5F96/Docs/R1%2D1902810%2Ezip [retrieved on Feb. 16, 2019] The Whole Document.
Huawei, et al., "Intra-UE Transmission Prioritization and Multiplexing", 3GPP Draft, 3GPP TSG RAN WGI Meeting #96, R1-1903081, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600777, 9 pages, Retrieved from the Internet: URL: http://www.3gpp.org/ftp/tsg%5Fran/WG1%5FRL1/TSGR1%5F96/Docs/R1%2D1903081%2Ezip. [retrieved on Feb. 16, 2019] the whole document.
Oppo: "Discussions on Intra-UE Multiplexing Scenarios", 3GPP Draft, 3GPP TSG RAN WG1 #96, R1-1902422, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051600118, 6 pages, Retrieved from the Internet: URL: http://www.3gpp.org/ftp/tsg%5Fran/WG1%5FRL1/TSGR1%5F96/Docs/R1%2D1902422%2Ezip. [retrieved on Feb. 15, 2019] the whole document.
Partial International Search Report—PCT/US2020/020674—ISA/EPO—dated Jun. 17, 2020.
Vivo: "UL Intra UE TX Prioritization for URLLC", 3GPP Draft, 3GPP TSG RAN WG1 #96, R1-1901698, UL Intra UE TX Prioritization for URLLC, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051599394, 5 pages, Retrieved from the Internet: URL: http://www.3gpp.org/ftp/tsg%5Fran/WG1%5FRL1/TSGR1%5F96/Docs/R1%2D1901698%2Ezip. [retrieved on Feb. 16, 2019] the whole document.
Intel Corporation: "On UCI Enhancements for eURLLC", R1-1900494, 3GPP TSG RAN WG1 Ad-Hoc Meeting 1901, Taipei, Taiwan, Jan. 21-25, 2019, pp. 1-6.
Sony: "Considerations on UL Intra-UE Tx Multiplexing", 3GPP Draft, 3GPP TSG RAN WG1 #96, R1-1902182—REL-16 URLLC—Intra-UE MUX VOO, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019 (Feb. 16, 2019), XP051599877, 9 pages, Retrieved from the Internet: URL: http://www.3gpp.org/ftp/tsg%5Fran/WG1%5FRL1/TSGR1%5F96/Docs/R1%2D1902182%2Ezip [retrieved on Feb. 16, 2019] Proposal 16; p. 7-p. 7.
Qualcomm Incorporated: "Intra-UE Prioritization Framework", 3GPP Draft, R2-1907924, Intra-UE Prioritization Framework, 3rd Generation Partnership Project (3GPP), Mobile Competence Centre, 650, Route Des Lucioles, F-06921 Sophia-Antipolis Cedex, France, vol. RAN WG2, No. Reno, USA, May 13, 2019-May 17, 2019, May 13, 2019 (May 13, 2019), XP051731337, 14 pages, Retrieved from the Internet: URL: http://www.3gpp.org/ftp/Meetings%5F3GPP%5FSYNC/RAN2/Docs/R2%2D1907924%2Ezip. [retrieved on May 13, 2019] p. 1-p. 3.
Qualcomm Incorporated: "Views on Intra-UE Prioritization", 3GPP Draft, R2-1908126, Views on Intra-UE Prioritization, 3rd Generation Partnership Project (3GPP), Mobile Competence Centre, 650, Route Des Lucioles, F-06921 Sophia-Antipolis Cedex, France, vol. RAN WG2, No. Reno, USA, May 13, 2019-May 17, 2019, May 12, 2019 (May 12, 2019), XP051740317, 4 pages, Retrieved from the Internet: URL: http://www.3gpp.org/ftp/tsg%5Fran/WG2%5FRL2/TSGR2%5F106/Docs/R2%2D1908126%2Ezip. [retrieved on May 12, 2019] section 2-section 4.

* cited by examiner

UPLINK COLLISION HANDLING

CROSS REFERENCE

The present Application for Patent is a Divisional of U.S. Pat. No. 11,122,622 by HOSSEINI et al., entitled "UPLINK COLLISION HANDLING," filed Feb. 28, 2020, which claims the benefit of U.S. Provisional Patent Application No. 62/826,634 by HOSSEINI et al., entitled "UPLINK COLLISION HANDLING," filed Mar. 29, 2019, and the benefit of U.S. Provisional Patent Application No. 62/848,520 by HOSSEINI et al., entitled "UPLINK COLLISION HANDLING," filed May 15, 2019, and the benefit of U.S. Provisional Patent Application No. 62/877,017 by HOSSEINI et al., entitled "UPLINK COLLISION HANDLING," filed Jul. 22, 2019, all assigned to the assignee hereof, and expressly incorporated herein.

BACKGROUND

The following relates generally to wireless communications, and more specifically to uplink collision handling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some transmissions on wireless channels (e.g., uplink control channels or uplink data channels, or both) may collide with one another when the resources utilized for each channel overlap. For example, feedback information such as hybrid acknowledgement repeat request (HARQ) acknowledgement (ACK) may be transmitted via an uplink control channel (e.g., a single slot physical uplink control channel (PUCCH)) that may overlap with a shared data channel (e.g., a single slot physical uplink shared channel (PUSCH)). While multiplexing techniques and scheduling may mitigate some of the collisions, these techniques may introduce latency and decrease reliability of the transmissions, which may be problematic for high priority or low latency transmissions.

SUMMARY

The described techniques relate to improved methods, systems, devices, and apparatuses that support uplink collision handling. Generally, the described techniques allow a user equipment (UE) to prioritize transmissions in the event that uplink transmissions for different channels or different priorities have overlapping time or frequency resources based on a collision resolution configuration. The collision resolution configuration may be preconfigured at the UE or indicated to the UE from a network node (e.g., a base station). In some examples, the collision resolution configuration may indicate how the UE is to handle collisions between uplink transmissions of different priorities, different channel types, different service types (e.g., mobile broadband or low latency communications), or carrying different information. For example, feedback information may be transmitted separately for multiple channels of multiple priorities or of different service types. In some cases, multiple hybrid acknowledgement repeat request (HARQ) acknowledgement (ACK) codebooks may be used such as one HARQ ACK codebook having a first priority level for a first set of feedback information and a second HARQ ACK codebook have a second priority level different from the first priority level for a second set of feedback information. For instance, a UE may generate one codebook for feedback information for ultra-reliable low latency communications (URLLC) and another separate codebook for feedback information for enhanced mobile broadband (eMBB) communications. In this example, the HARQ ACK bits of each codebook may be reported separately (e.g., some physical uplink control channel (PUCCH) resources are used for URLLC per slot and some are used for eMBB).

According to some aspects, the collision resolution configuration may specify collision handling between multiple overlapping channels (e.g., two or more channels of the same priority), which in one example may include resolving the collisions among the channels of the same priority first. In another example, the collision handling may specify to resolve collisions among the channels of the same service type first, or across all of the channels of all priorities at once. In some cases, collision handling may specify to resolve collusions among channels of the same type and then resolve collisions between channels of different types (e.g., resolve collisions for control channels or control channels carrying feedback information, then resolve collisions between control channels and data channels).

In some examples, collisions may be resolved by dropping or rescheduling overlapping information from the lower priority transmission(s) or channel(s) in consideration of the higher priority transmission(s) or channel(s), or by multiplexing or piggybacking overlapping information of transmission(s) or channel(s) of a first priority level with transmission(s) or channel(s) of a second priority level. For example, transmissions on lower priority channels may be dropped in favor of higher priority channels or some information from the lower priority channels may be piggybacked on one or more higher priority channels.

A method of wireless communications at a UE is described. The method may include identifying first uplink information associated with a first priority level for transmission to a base station, identifying second uplink information associated with a second priority level for transmission to the base station, determining a first set of time resources for transmission of the first uplink information and a second set of time resources for transmission of the second uplink information, determining a collision resolution configuration for transmission of the first uplink information and the second uplink information based on the first priority level and the second priority level, and transmitting at least a portion of the first uplink information or the second uplink information according to the collision resolution configuration via at least a portion of the first and second sets of time resources.

An apparatus for wireless communications at a UE is described. The apparatus may include a processor, memory in electronic communication with the processor, and instructions stored in the memory. The instructions may be executable by the processor to cause the apparatus to identify first uplink information associated with a first priority level for transmission to a base station, identify second uplink information associated with a second priority level for transmission to the base station, determine a first set of time resources for transmission of the first uplink information and a second set of time resources for transmission of the second uplink information, determine a collision resolution configuration for transmission of the first uplink information and the second uplink information based on the first priority level and the second priority level, and transmit at least a portion of the first uplink information or the second uplink information according to the collision resolution configuration via at least a portion of the first and second sets of time resources.

Another apparatus for wireless communications at a UE is described. The apparatus may include means for identifying first uplink information associated with a first priority level for transmission to a base station, identifying second uplink information associated with a second priority level for transmission to the base station, determining a first set of time resources for transmission of the first uplink information and a second set of time resources for transmission of the second uplink information, determining a collision resolution configuration for transmission of the first uplink information and the second uplink information based on the first priority level and the second priority level, and transmitting at least a portion of the first uplink information or the second uplink information according to the collision resolution configuration via at least a portion of the first and second sets of time resources.

A non-transitory computer-readable medium storing code for wireless communications at a UE is described. The code may include instructions executable by a processor to identify first uplink information associated with a first priority level for transmission to a base station, identify second uplink information associated with a second priority level for transmission to the base station, determine a first set of time resources for transmission of the first uplink information and a second set of time resources for transmission of the second uplink information, determine a collision resolution configuration for transmission of the first uplink information and the second uplink information based on the first priority level and the second priority level, and transmit at least a portion of the first uplink information or the second uplink information according to the collision resolution configuration via at least a portion of the first and second sets of time resources.

Some examples of the method, apparatuses, and non-transitory computer-readable medium described herein may further include operations, features, means, or instructions for multiplexing the first uplink information on a first uplink channel associated with a third set of time resources non-overlapping with the second set of time resources based on the collision resolution configuration, and transmitting the first uplink information over the first uplink channel via the third set of time resources and the second uplink information over a second uplink channel via the second set of time resources, where the first uplink information includes feedback information of a first HARQ codebook associated with the first priority level and the second uplink information includes feedback information of a second HARQ codebook associated with the second priority level, the second priority level higher than the first priority level.

In some examples of the method, apparatuses, and non-transitory computer-readable medium described herein, the first uplink channel includes an uplink control channel associated with the first priority level.

Some examples of the method, apparatuses, and non-transitory computer-readable medium described herein may further include operations, features, means, or instructions for multiplexing the first uplink information on a first uplink channel associated with a third set of time resources non-overlapping with the second set of time resources based on the collision resolution configuration, and transmitting the first uplink information over the first uplink channel via the third set of time resources and the second uplink information over a second uplink channel via the second set of time resources, where the first uplink channel may be a first uplink shared channel associated with the first priority level and the second uplink channel may be a second uplink shared channel associated with the second priority level higher than the first priority level.

Some examples of the method, apparatuses, and non-transitory computer-readable medium described herein may further include operations, features, means, or instructions for multiplexing the first uplink information on a first uplink channel associated with a third set of time resources non-overlapping with the second set of time resources based on the collision resolution configuration, and transmitting the first uplink information over the first uplink channel via the third set of time resources and the second uplink information over a second uplink channel via the second set of time resources, where the first uplink information includes channel state information associated with the first priority level and the second uplink information includes feedback information associated with the second priority level higher than the first priority level.

Some examples of the method, apparatuses, and non-transitory computer-readable medium described herein may further include operations, features, means, or instructions for multiplexing a subset of the first uplink information and all of the second uplink information on a single uplink channel associated with a third set of time resources based on the collision resolution configuration, and transmitting the subset of the first uplink information and all of the second uplink information over the single uplink channel via the third set of time resources, where the subset of the first uplink information includes scheduling information associated with the first priority level and the second uplink information includes feedback information associated with the second priority level higher than the first priority level.

Some examples of the method, apparatuses, and non-transitory computer-readable medium described herein may further include operations, features, means, or instructions for multiplexing a subset of the first uplink information on a first uplink channel associated with a third set of time resources based on the collision resolution configuration, where the subset of the first uplink information includes feedback information of a first HARQ codebook associated with the first priority level or scheduling information associated with the first priority level, dropping the multiplexed subset of the first uplink information based on the third set of time resources at least partially overlapping with the second set of time resources, and transmitting the second uplink information via the second set of time resources, where the second uplink information includes feedback information of a second HARQ codebook associated with the second priority level, the second priority level higher than the first priority level.

Some examples of the method, apparatuses, and non-transitory computer-readable medium described herein may further include operations, features, means, or instructions for multiplexing a subset of the first uplink information and all of the second uplink information on a single uplink channel associated with a third set of time resources based on the collision resolution configuration, where the subset of the first uplink information includes feedback information of a first HARQ codebook associated with the first priority level or scheduling information associated with the first priority level and the second uplink information includes feedback information of a second HARQ codebook associated with the second priority level, the second priority level higher than the first priority level, and transmitting the subset of the first uplink information and all of the second uplink information over the single uplink channel via the third set of time resources.

Some examples of the method, apparatuses, and non-transitory computer-readable medium described herein may further include operations, features, means, or instructions for transmitting one or more uplink control channels associated with the first priority level based on the third set of time resources nonoverlapping with resources for the one or more uplink control channels.

Some examples of the method, apparatuses, and non-transitory computer-readable medium described herein may further include operations, features, means, or instructions for dropping the first uplink information based on the collision resolution configuration, the first uplink information including channel state information associated with the first priority level, multiplexing the second uplink information with third uplink information, where the third uplink information includes feedback information of a first HARQ codebook associated with the first priority level and the second uplink information includes feedback information of a second HARQ codebook associated with the second priority level higher than the first priority level, and transmitting the multiplexed second uplink information and third uplink information.

In some examples of the method, apparatuses, and non-transitory computer-readable medium described herein, the collision resolution configuration may include operations, features, means, or instructions for resolving collisions across channels associated with the same priority level before resolving collisions across priority levels.

In some examples of the method, apparatuses, and non-transitory computer-readable medium described herein, the collision resolution configuration may include operations, features, means, or instructions for resolving collisions across all channels independent of priority level or across all channels of the same type before resolving collisions across channel types.

Some examples of the method, apparatuses, and non-transitory computer-readable medium described herein may further include operations, features, means, or instructions for dropping the first uplink information based on the collision resolution configuration, the first uplink information including channel state information or scheduling information associated with the first priority level, and transmitting the second uplink information and third uplink information, where the third uplink information includes feedback information of a first HARQ codebook associated with the first priority level and the second uplink information includes feedback information of a second HARQ codebook associated with the second priority level higher than the first priority level.

Some examples of the method, apparatuses, and non-transitory computer-readable medium described herein may further include operations, features, means, or instructions for multiplexing the first uplink information over a third set of time resources nonoverlapping with the second set of time resources based on the collision resolution configuration, and transmitting the first uplink information via the third set of time resources and the second uplink information via the second set of time resources, where the first uplink information includes uplink control information associated with the first priority level and the second uplink information includes shared data associated with the second priority level higher than the first priority level.

Some examples of the method, apparatuses, and non-transitory computer-readable medium described herein may further include operations, features, means, or instructions for multiplexing the first uplink information over a third set of time resources based on the collision resolution configuration, where the first uplink information includes uplink control information associated with the first priority level, dropping the multiplexed first uplink information based on the third set of time resources at least partially overlapping with the second set of time resources, and transmitting the second uplink information via the second set of time resources, where the second uplink information includes shared data associated with the second priority level higher than the first priority level.

Some examples of the method, apparatuses, and non-transitory computer-readable medium described herein may further include operations, features, means, or instructions for multiplexing a subset of the first uplink information and all of the second uplink information on a single uplink channel associated with a third set of time resources based on the collision resolution configuration, where the subset of the first uplink information includes feedback information associated with the first priority level and the second uplink information includes shared data associated with the second priority level higher than the first priority level, and transmitting the subset of the first uplink information and all of the second uplink information over the single uplink channel via the third set of time resources, where the single uplink channel includes an uplink shared channel associated with the first priority level.

Some examples of the method, apparatuses, and non-transitory computer-readable medium described herein may further include operations, features, means, or instructions for identifying third uplink information associated with a third priority level for transmission to the base station, identifying fourth uplink information associated with a fourth priority level for transmission to the base station, multiplexing a subset of the first uplink information and all of the second uplink information on a first uplink channel associated with the second set of time resources based on the collision resolution configuration, where the subset of the first uplink information includes feedback information associated with the first priority level and the second uplink information includes shared data, multiplexing a subset of the third uplink information and all of the fourth uplink information on a second uplink channel associated with a third set of time resources nonoverlapping with the second set of time resources based on the collision resolution configuration, where the subset of the third uplink information includes feedback information associated with the third priority level and the fourth uplink information includes shared data associated with the fourth priority level, transmitting the subset of the first uplink information and all of the second uplink information over the first uplink channel via the second set of time resources, where the first uplink channel includes a first uplink shared channel associated with the first priority level, and transmitting the subset of the third uplink information and all of the fourth uplink information over the second uplink channel via the third set of time resources, where the second uplink channel includes a second uplink shared channel associated with the third priority level.

Some examples of the method, apparatuses, and non-transitory computer-readable medium described herein may further include operations, features, means, or instructions for identifying third uplink information associated with a third priority level for transmission to the base station, identifying fourth uplink information associated with a fourth priority level for transmission to the base station, multiplexing the first uplink information and the third uplink information on a first uplink channel associated with a third set of time resources based at least in part on the collision resolution configuration, where the first uplink channel includes a first uplink shared channel associated with the first priority level and the first uplink information includes first control information, multiplexing the second uplink information and the fourth uplink information on a second uplink channel associated with a fourth set of time resources based at least in part on the collision resolution configuration, wherein the second uplink channel includes a second uplink shared channel associated with the second priority level and the second uplink information includes second control information, the third set of time resources overlapping with the fourth set of time resources, transmitting the second uplink channel via the fourth set of time resources, where the second priority level is higher than the first priority level, and selectively transmitting the first uplink channel via the third set of time resources.

Some examples of the method, apparatuses, and non-transitory computer-readable medium described herein may further include operations, features, means, or instructions for receiving a first uplink grant including a first downlink assignment index (DAI) indicating a number of feedback information bits on the first uplink channel associated with the first priority level, where the first uplink grant is associated with the first uplink channel, and receiving a second uplink grant including a second DAI indicating a number of feedback information bits on the second uplink channel associated with the second priority level, where the second uplink grant is associated with the second uplink channel.

In some examples of the method, apparatuses, and non-transitory computer-readable medium described herein, the first and second priority levels are the same, and the third and fourth priority levels are the same. In some examples of the method, apparatuses, and non-transitory computer-readable medium described herein, the first priority level is higher than the third priority level, and the second priority level is higher than the fourth priority level.

Some examples of the method, apparatuses, and non-transitory computer-readable medium described herein may further include operations, features, means, or instructions for identifying third uplink information associated with a third priority level for transmission to the base station, identifying fourth uplink information associated with a fourth priority level for transmission to the base station, multiplexing a subset of the first uplink information and all of the second uplink information on a first uplink channel associated with a third set of time resources based on the collision resolution configuration, where the subset of the first uplink information includes feedback information associated with the first priority level and the second uplink information includes shared data, multiplexing a subset of the third uplink information and all of the fourth uplink information on a second uplink channel associated with the second set of time resources based on the collision resolution configuration, where the subset of the third uplink information includes feedback information associated with the third priority level and the fourth uplink information includes shared data associated with the fourth priority level, and transmitting the subset of the first uplink information and all of the second uplink information over the first uplink channel via a first component carrier of the second set of time resources, where the first uplink channel includes an uplink shared channel associated with the first priority level.

Some examples of the method, apparatuses, and non-transitory computer-readable medium described herein may further include operations, features, means, or instructions for transmitting the subset of the third uplink information and all of the fourth uplink information over the second uplink channel via a second component carrier of the second set of time resources, where the second uplink channel includes an uplink shared channel associated with the third priority level.

Some examples of the method, apparatuses, and non-transitory computer-readable medium described herein may further include operations, features, means, or instructions for transmitting additional uplink information over a third uplink channel via a third component carrier of the second set of time resources, where the third uplink channel includes an uplink shared channel associated with a fifth priority level.

Some examples of the method, apparatuses, and non-transitory computer-readable medium described herein may further include operations, features, means, or instructions for dropping the subset of the third uplink information and all of the fourth uplink information.

Some examples of the method, apparatuses, and non-transitory computer-readable medium described herein may further include operations, features, means, or instructions for multiplexing the first uplink information and the second uplink information over a third set of time resources based on the collision resolution configuration, where the first uplink information includes shared data associated with the first priority level and the second uplink information includes uplink control information associated with the second priority level higher than the first priority level, dropping a control channel based on the third set of time resources at least partially overlapping with a fourth set of time resources associated with the control channel, the control channel associated with a third priority level lower than the first and second priority levels, and transmitting the multiplexed first uplink information and second uplink information over the third set of time resources.

Some examples of the method, apparatuses, and non-transitory computer-readable medium described herein may further include operations, features, means, or instructions for multiplexing the first uplink information and the second uplink information over a third set of time resources based on the collision resolution configuration, where the first uplink information includes shared data associated with the first priority level and the second uplink information includes uplink control information associated with the second priority level higher than the first priority level, multiplexing uplink control information associated with a third priority level with the multiplexed first and second uplink information based on the third set of time resources at least partially overlapping with a fourth set of time resources associated with the uplink control information, the third priority level being lower than the first and second priority levels, and transmitting the multiplexed uplink control information, the first uplink information, and the second uplink information.

Some examples of the method, apparatuses, and non-transitory computer-readable medium described herein may further include operations, features, means, or instructions for dropping a control channel associated with a third set of time resources that at least partially overlaps with the first or second set of time resources, the control channel associated with a third priority level lower than the first and second priority levels, and multiplexing the first and second uplink information.

Some examples of the method, apparatuses, and non-transitory computer-readable medium described herein may further include operations, features, means, or instructions for multiplexing the first uplink information and the second uplink information over a third set of time resources based on the collision resolution configuration, where the first uplink information includes shared data associated with the first priority level and the second uplink information includes uplink control information associated with the second priority level higher than the first priority level, transmitting the multiplexed first and second uplink information, and transmitting a shared data channel or a control channel associated with a third priority level higher than the first and second priority levels over a fourth set of time resources nonoverlapping with the third set of time resources.

Some examples of the method, apparatuses, and non-transitory computer-readable medium described herein may further include operations, features, means, or instructions for multiplexing the first uplink information and the second uplink information over a third set of time resources based on the collision resolution configuration, where the first uplink information includes shared data associated with the first priority level and the second uplink information includes uplink control information associated with the second priority level higher than the first priority level, dropping the multiplexed first and second uplink information based on the third set of time resources at least partially overlapping a fourth set of time resources associated with a shared data channel or a control channel associated with a third priority level higher than the first and second priority levels, and transmitting the shared data channel or the control channel over the fourth set of time resources.

Some examples of the method, apparatuses, and non-transitory computer-readable medium described herein may further include operations, features, means, or instructions for multiplexing the first uplink information and the second uplink information over a third set of time resources based on the collision resolution configuration, where the first uplink information includes shared data or uplink control information associated with the first priority level and the second uplink information includes uplink control information associated with the second priority level lower than the first priority level, and transmitting the multiplexed first and second uplink information.

Some examples of the method, apparatuses, and non-transitory computer-readable medium described herein may further include operations, features, means, or instructions for dropping the first uplink information based on the first set of time resources at least partially overlapping the second set of time resources, where the first uplink information includes information associated with the first priority level, transmitting the second uplink information via the second set of time resources, the second uplink information including shared data or uplink control information associated with the second priority level higher than the first priority level, multiplexing one or more channels via a third set of time resources nonoverlapping with the second set of time resources, and transmitting the multiplexed one or more channels.

In some examples of the method, apparatuses, and non-transitory computer-readable medium described herein, the collision resolution configuration indicates a multiplexing configuration for the first priority level and the second priority level, an uplink channel for the first priority level or the second priority level, a set of uplink resources for transmission of uplink information, or any combination thereof.

Some examples of the method, apparatuses, and non-transitory computer-readable medium described herein may further include operations, features, means, or instructions for identifying the first priority level based on the first uplink information including channel state information.

Some examples of the method, apparatuses, and non-transitory computer-readable medium described herein may further include operations, features, means, or instructions for identifying the first priority level associated with channel state information based at least in part on a type of the channel state information.

In some examples of the method, apparatuses, and non-transitory computer-readable medium described herein, identifying the first priority level may include operations, features, means, or instructions for identifying that the first uplink information includes a periodic channel state information report, and determining that the first priority level may be lower than a priority level of a second channel (e.g., a low latency channel) based on the first uplink information including the periodic channel state information report.

In some examples of the method, apparatuses, and non-transitory computer-readable medium described herein, the first priority level may be associated with a priority level of a mobile broadband channel based on the first uplink information including the periodic channel state information report.

In some examples of the method, apparatuses, and non-transitory computer-readable medium described herein, identifying the first priority level may include operations, features, means, or instructions for identifying that the first uplink information includes a semi-persistent channel state information report included in an uplink control channel, and determining that the first priority level may be lower than a priority level of a second channel (e.g., a low latency channel) based on the first uplink information including the semi-persistent channel state information report included in the uplink control channel.

In some examples of the method, apparatuses, and non-transitory computer-readable medium described herein, identifying the first priority level may include operations, features, means, or instructions for receiving an uplink grant scheduling an uplink shared channel, identifying that the first uplink information includes an aperiodic channel state information report scheduled by the uplink grant for transmission on the uplink shared channel, and determining that the first priority level may be the same as a priority level indicated by the uplink grant for the uplink shared channel.

Some examples of the method, apparatuses, and non-transitory computer-readable medium described herein may further include operations, features, means, or instructions for multiplexing the aperiodic channel state information with other uplink control information also associated with the first priority level, and transmitting the multiplexed aperiodic channel state information and other uplink control information via the uplink shared channel.

In some examples of the method, apparatuses, and non-transitory computer-readable medium described herein, identifying the first priority level may include operations, features, means, or instructions for identifying that the first uplink information includes a semi-persistent channel state information report included in an uplink shared channel, and determining that the first priority level may be lower than a priority level of a low latency channel based on the first uplink information including the semi-persistent channel state information report included in the uplink shared channel.

In some examples of the method, apparatuses, and non-transitory computer-readable medium described herein, identifying the first priority level may include operations, features, means, or instructions for receiving an uplink grant scheduling an uplink shared channel, identifying that the first uplink information includes a semi-persistent channel state information report activated by the uplink grant for transmission on the uplink shared channel, and determining that the first priority level may be the same as a priority level indicated by the uplink grant for the uplink shared channel.

Some examples of the method, apparatuses, and non-transitory computer-readable medium described herein may further include operations, features, means, or instructions for receiving an indication of the collision resolution configuration from the base station.

DETAILED DESCRIPTION

Figure 1:
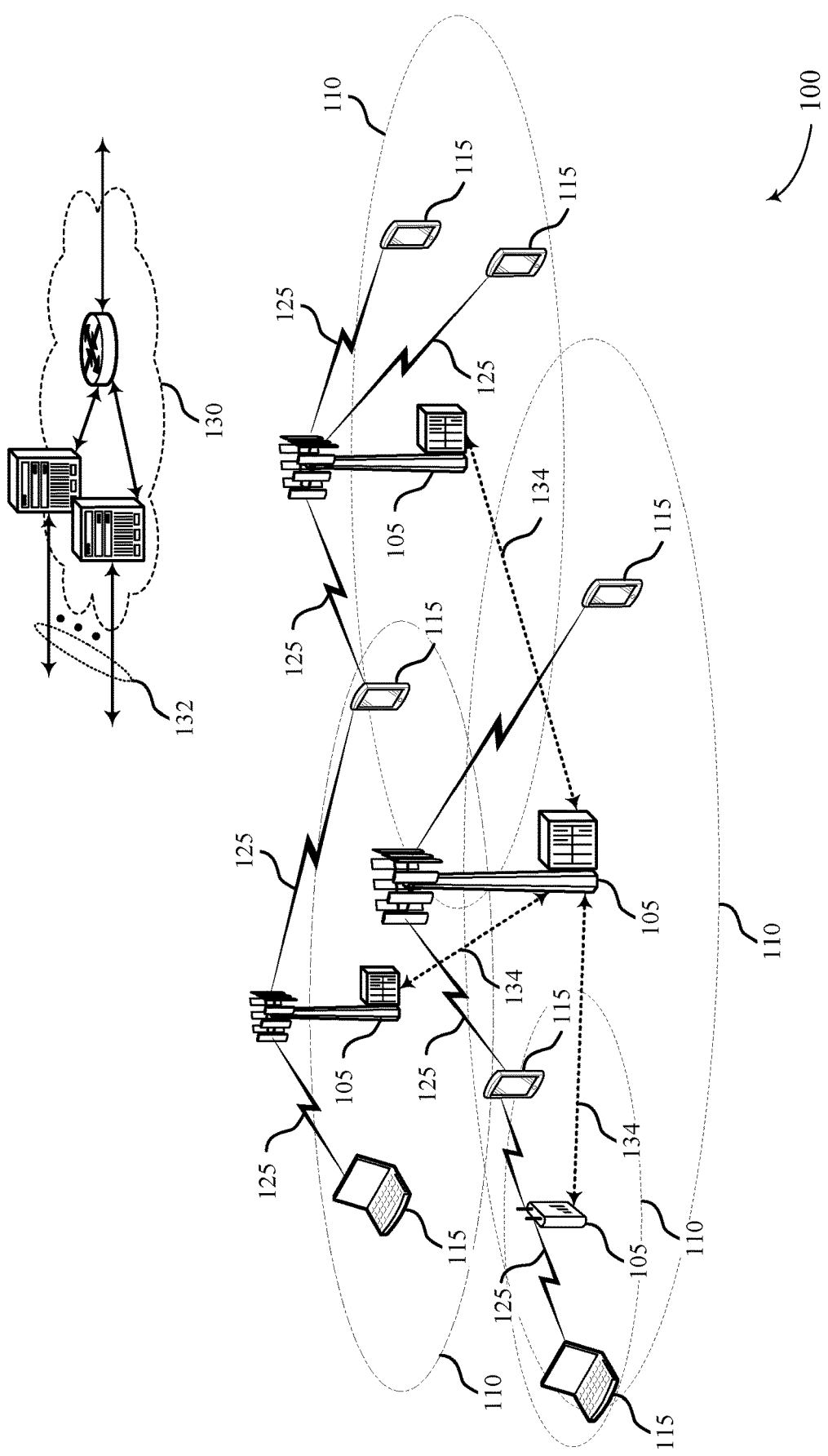
FIG. 1 illustrates an example of a wireless communications system that supports uplink collision handling in accordance with aspects of the present disclosure.

Wireless communications systems may schedule communication resources to support both uplink and downlink transmissions. For example, a wireless communications system may allocate a set of resources for uplink transmissions for a user equipment (UE). In some cases, collisions may occur between multiple uplink communications (e.g., if the multiple channels have overlapping time and/or frequency resources. In anticipation of collisions that may occur, a UE may follow a set of rules specifying how to handle transmissions in the event of a collision. One example set of rules includes the handling of the transmission of uplink control information (UCI), and may referred to as UCI multiplexing rules. The UCI multiplexing rules may apply if certain conditions are first met. In some cases, the UCI multiplexing rules may not consider multiple hybrid acknowledgement repeat request (HARQ) acknowledgement (ACK) codebooks, which may be associated with HARQ-ACK feedback for respective service types, or a corresponding priority level associated with a given HARQ ACK codebook. Further, if the certain conditions are not met, the UCI multiplexing rule may not apply, and an error condition may result. For example, in the case that just one pair of overlapping channels does not meet the UCI multiplexing rule timeline requirements, the UE may designate the uplink transmission as an error case for all uplink channels in the group of overlapping channels, and in some cases, the UE behavior may not be specified. This may increase latency or delays for transmissions, which may adversely affect communications and in particular those associated with low latency or high reliability, as these transmissions may be dropped.

This latency may be further extended due to the increasing amount of feedback information (e.g., multiple HARQ ACK codebooks) that may overlap. For example, feedback information may be transmitted separately for multiple channels of different priorities or service types. As priority levels vary or more service types (e.g., enhanced mobile broadband (eMBB) and ultra-reliable low latency communications (URLLC)) are used, communications of multiple HARQ ACK codebooks may result in more collisions. For example, a UE may generate one HARQ ACK codebook for feedback information for URLLC and one HARQ ACK codebook for feedback information for eMBB. In this example, the HARQ ACK bits of each codebook may be reported separately (e.g., some physical uplink control channel (PUCCH) resources are used for URLLC per slot and some are used for eMBB).

Priorities may be assigned to each channel based on the channel or transmission type (e.g., service type or control information type) for each of the rules described herein. In some cases, the prioritization of some channels may vary across different rules. In some examples, channel priority may be assigned based on service type, where low latency communications (e.g., URLLC transmissions) may have a higher priority than mobile broadband (e.g., eMBB) communications. In some examples, channel priority may be assigned based on transmission type or type of information carried (e.g., feedback information such as one or more HARQ ACK codebooks). In such cases, feedback information may have a higher priority than UCI or scheduling requests (SRs). In some examples, channel priority may be assigned based on channel type, and a shared channel (e.g., a physical uplink shared channel (PUSCH)) may have a higher priority than a control channel (e.g., PUCCH). In some cases, the prioritization of channels may include a combination of considerations (e.g., service type, transmission type, and channel type). In some examples, priority may for certain types of information or for a given channel may be defined or indicated at the physical layer (e.g., through physical layer signaling). In some examples, priority may be given based on downlink control information (DCI) such as by using different DCI formats or based on an information field (e.g., an information element) in the DCI. In other examples, priority may be specified or indicated via a radio network temporary identifier (RNTI), a control resource set (CORESET) index, a search space index, etc.

Additionally or alternatively, priority rules may be established to determine the priority level (e.g., a relative priority) of a channel state information (CSI) report. More specifically, the priority level of the CSI report may be based on the CSI report type. Multiple types of CSI reports may be used in a wireless communications network (e.g., New Radio (NR)). For instance, a periodic, a semi-persistent, and/or an aperiodic CSI report may be used in NR, and each type of CSI may be configured differently. A periodic CSI report may be configured through Radio Resource Control (RRC) signaling from a base station. The UE may then transmit periodic CSI on the PUCCH. A semi-persistent CSI report may be configured through RRC signaling from a base station and may be activated and/or deactivated by a Medium Access Control-control element (MAC-CE). The UE may then transmit semi-persistent CSI on the PUCCH. Further, a semi-persistent CSI report may be activated and/or deactivated by DCI, which may include a cyclic redundancy check (CRC) scrambled by a semi-persistent-CSI-RNTI. The UE may then transmit semi-persistent CSI on the PUSCH. An aperiodic CSI report may be scheduled (e.g., dynamically) by an uplink grant from a base station. In some cases, the uplink grant may also schedule uplink data (e.g., UL-SCH) on the same uplink channel (e.g., PUSCH) as the aperiodic CSI report. In other cases, the uplink grant may not schedule uplink data (e.g., UL-SCH) on the same uplink channel (e.g., PUSCH) as the aperiodic CSI report. The UE may then transmit aperiodic CSI, with or without data, on the PUSCH.

The techniques described herein allow a UE to prioritize transmissions in the event that uplink transmissions for different channels or different priorities have overlapping time or frequency resources based on a collision resolution configuration. The collision resolution configuration may be preconfigured at the UE or indicated to the UE from a network node (e.g., a base station), and may indicate how the UE is to handle collisions between uplink transmissions of different priorities, different channel types, different service types, or carrying different information. For example, the collision resolution configuration may specify collision handling between multiple overlapping channels (e.g., two or more channels of the same priority), which in one example may include resolving the collisions among the channels of the same priority first (e.g., feedback information (e.g., HARQ-ACK) transmissions first, and then other uplink control information such as channel state information (CSI)). In another example, collision handling may specify to resolve collisions among the channels of the same service type first (e.g., eMBB channels first, and then URLLC channels), or across all of the channels of all priorities at once. In some cases, collision handling may specify to resolve collusions among channels of the same type and then resolve collisions between channels of different types (e.g., resolve collisions for control channels or control channels carrying feedback information, then resolve collisions between control channels and data channels).

According to some aspects, the collision resolution configuration may specify that collisions may be resolved by dropping or rescheduling overlapping information from the lower priority transmission(s) or channel(s) in consideration of the higher priority transmission(s) or channel(s), or by multiplexing or piggybacking overlapping information of transmission(s) or channel(s) of a first priority level with transmission(s) or channel(s) of a second priority level. For example, transmissions on lower priority channels may be dropped in favor of higher priority channels. Thus, a UE may determine a priority of the overlapping channels, perform collision resolution based on the collision resolution configuration, and then communicate uplink information accordingly (e.g., highest priority information is transmitted in favor of lower priority information). The UE may apply prioritization rules (e.g., based on service type) to various situations where uplink transmissions overlap. Additionally, or alternatively, the collision rules described herein may be applied to PUCCH collisions as well as PUCCH and PUSCH collisions.

In some cases, a PUCCH carrying HARQ-ACK for URLLC (associated with a first codebook of a first priority), which may include other UCI, and a PUCCH carrying HARQ-ACK for eMBB (associated with a second codebook of a second priority lower than the first priority), which may include other UCI, may be resolved first regardless of the presence of the other channels. For instance, both PUCCHs may be transmitted if the associated resources for each PUCCH are not overlapping. Alternatively, the PUCCHs may be multiplexed together in a single PUCCH channel and transmitted (e.g., if a portion of the resources are overlapping).

If the resulting PUCCH resource do not collide with resources allocated for other channels, the other channels may also be transmitted. If the resulting PUCCH resource collides with another PUCCH resource carrying CSI or other UCI, the PUCCH carrying CSI or other UCI is dropped. If the resulting PUCCH resource collides with a data channel (e.g., eMBB PUSCH or URLLC PUSCH), either the data channel is dropped or the HARQ-ACK information for the multiple codebooks is piggybacked on the data channel. Alternatively, a portion of HARQ-ACK information may be bundled or other UCI may be dropped in favor of a higher priority transmission. In some cases, a UE may determine to either drop the data channel or piggyback the HARQ-ACK information based on an indication from the network (e.g., a configuration from the base station).

Aspects of the disclosure are initially described in the context of wireless communications systems. Aspects are also described with respect to example communication schemes. Aspects of the disclosure are further illustrated by and described with reference to apparatus diagrams, system diagrams, and flowcharts that relate to uplink collision handling.

FIG. 1 illustrates an example of a wireless communications system 100 that supports uplink collision handling in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or may be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, collisions between two channels (e.g., between a PUCCH and a PUCCH or between a PUCCH and a PUSCH) may result in a multiplexing behavior that is designed for handling single slot (e.g., single TTI) collisions between two channels (e.g., between a PUCCH and a PUCCH or between a PUCCH and a PUSCH). When a single-slot PUCCH overlaps with a single-slot PUCCH or a single-slot PUSCH in slot n for a PUCCH group, a UE 115 may multiplex all UCI on either one PUCCH or one PUSCH based on one or more UCI multiplexing rules. In some cases, the UCI multiplexing rule may be used when the first symbol of the earliest PUCCH(s)/PUSCH(s) among all the overlapping channels starts no earlier than symbol N1+X after the last symbol of PDSCH(s) and when the first symbol of the earliest PUCCH(s)/PUSCH(s) among all the overlapping channels starts no earlier than N2+Y after the last symbol of physical downlink control channels (PDCCHs) scheduling uplink transmissions including HARQ ACK and PUSCH (if applicable) for slot n. In other cases, if at least one pair of overlapping channels does not meet the timeline requirements (e.g., N1+X after the last symbol of PDSCH(s) and N2+Y after the last symbol of PDCCHs), then the UE 115 may consider it is an error case for all uplink channels in the group of overlapping channels. In some examples, the behavior of UE 115 may not be specified in this case. These cases include a single codebook HARQ ACK or HARQ negative ACK (NACK) on a single slot (e.g., slot n) of a single PUCCH.

As additional priorities are introduced (e.g., based on transmission type, channel type, information type, or service type), multiple HARQ codebooks may be used, which may have overlapping time or frequency resources. For example, some systems may include multiple HARQ ACK codebooks that may be simultaneously constructed to transmit multiple sets of feedback information (e.g., one set of feedback information for communications of a first priority level or service type and another set of feedback information for communications of a second priority level or service type). In some examples, two codebooks may be associated with different service types (e.g., a UE 115 may generate one codebook for URLLC and one codebook for eMBB). In this example, the HARQ ACK bits of each codebook may be reported separately (e.g., some PUCCH resources are used for URLLC per slot and some are used for eMBB). When two (or more) HARQ ACK codebooks associated with feedback information of different priority levels or service types, collisions (e.g., if the two HARQ ACK codebooks are intended to be transmitted in resources overlapping in time) may be handled by the UE 115 in accordance with a collision resolution configuration. In some cases, the collision resolution configuration may specify rules for multiplexing, prioritizing, and parallel transmissions for transmitting uplink information.

Some options for handling the collision between multiple overlapping channels (e.g., two or more channels of the same priority) may include resolving the collisions among the channels of the same priority first (e.g., feedback information transmissions first, and then control information), among the channels of the same service type first (e.g., eMBB channels first, and then eURLLC channel(s)), or across all of the channels of all priorities at once. Priority may be determined for some transmissions (e.g., CSI reports) based on the type of transmission (e.g., periodic, semi-persistent, or aperiodic). In some examples, collisions may be resolved by dropping or rescheduling overlapping information from the lower priority transmission(s) or channel(s) in consideration of the higher priority transmission(s) or channel(s), or by multiplexing or piggybacking overlapping information from a first priority transmission(s) or channel(s) with a second priority transmission(s) or channel(s). For example, transmissions on lower priority channels may be dropped. In some examples, channel priority may be assigned based on transmission type, and feedback information (e.g., HARQ ACK codebook(s)) may have a higher priority than UCI or scheduling requests. In some examples, channel priority may be assigned based on physical channel type, and a shared channel (e.g., PUSCH) may have a higher priority than a control channel (e.g., PUCCH). In some cases, the prioritization of channels may include a combination of considerations (e.g., service type, transmission type, and physical channel type).

Figure 2:
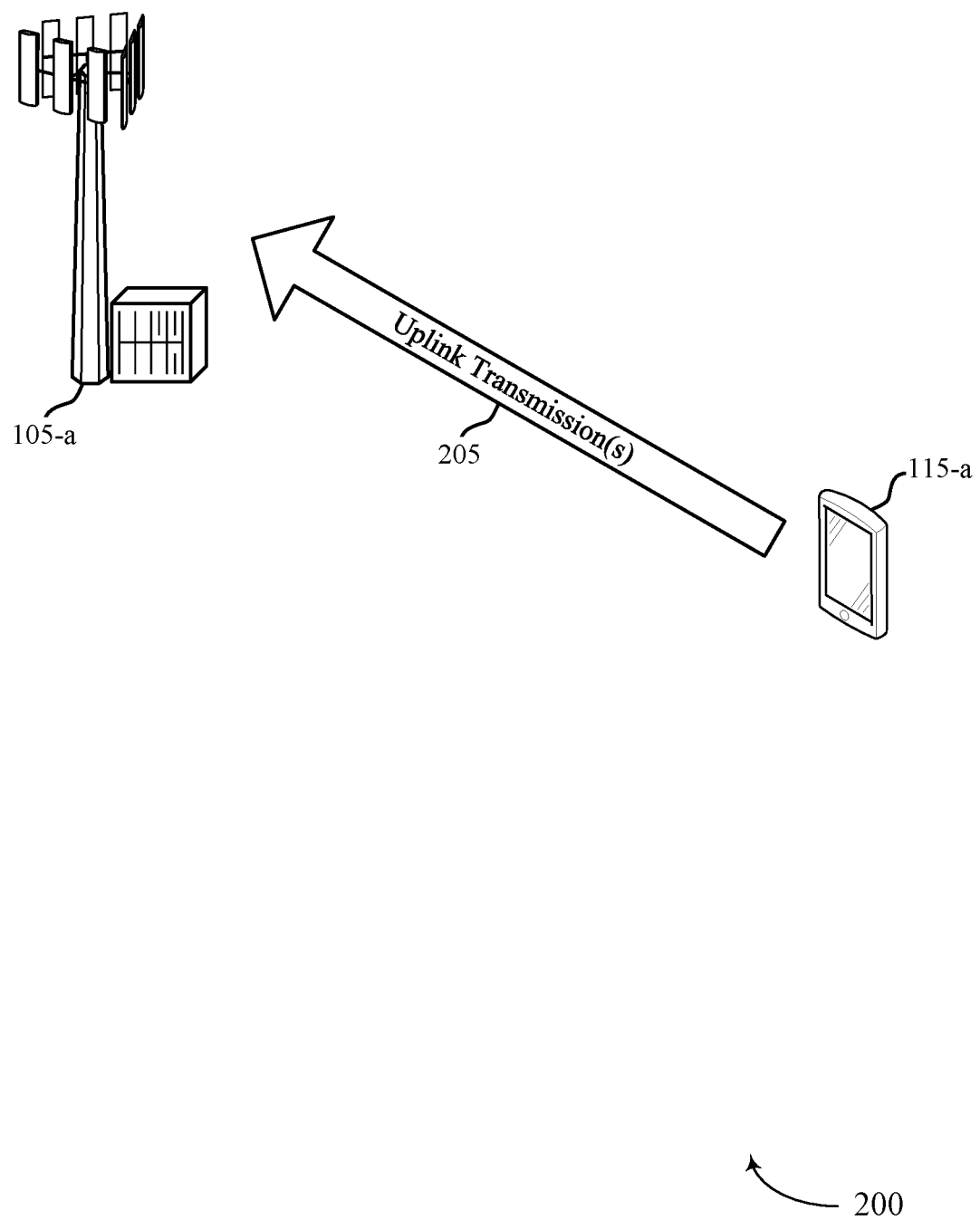
FIG. 2 illustrates an example of a wireless communications system that supports uplink collision handling in accordance with aspects of the present disclosure.

FIG. 2 illustrates an example of a wireless communications system 200 that supports uplink collision handling in accordance with aspects of the present disclosure. In some examples, wireless communications system 200 may implement aspects of wireless communications system 100. The wireless communications system 200 may include UE 115-*a* and base station 105-*a*, which may be examples of the UE 115 and base station 105 described with reference to FIG. 1. As shown, UE 115-*a* may communicate with base station 105-*a* via communications link 205.

In some cases, base station 105-*a* may transmit control information indicating the scheduled and allocated resources in a downlink transmission to the UE 115-*a*. For example, the base station 105 may transmit downlink control information (DCI) on a downlink control channel, such as a PDCCH. In some examples, the base station 105 may transmit UE-specific scheduling assignments for downlink resource allocation, uplink grants, physical random access channel (PRACH) responses, uplink power control commands, and common scheduling assignments for signaling messages (e.g., such as system information) on the PDCCH. The base station 105 may transmit the control information during one or more symbols within a given TTI (e.g., a slot, a mini-slot, an sTTI).

In some cases, base station 105-*a* may transmit control information associated with a first scheduled uplink transmission. The control information may be transmitted via downlink. Additionally, base station 105-*a* may also transmit other control information via downlink. In some cases, the DCI may include scheduling information for uplink transmissions via communications link 205. In one example, two uplink transmissions may be scheduled for uplink control information and feedback information. In instances where the two uplink transmissions do not overlap (e.g., in time or frequency), the uplink control information that is scheduled for each uplink channel may be transmitted using their respective resources via communications link 205. However, in some instances, two uplink transmissions are scheduled having overlapping time or frequency resources. In such situations, a collision resolution configuration may be used to allow the UE 115-*a* to determine when and how to multiplex the scheduled uplink transmissions.

In FIG. 2, the downlink channels from base station 105-*a* may schedule overlapping transmissions of different service types or priority levels. In one example, the service types may be eMBB and URLLC. As discussed herein, prioritizing methods of a collision resolution configuration may be employed to determine a higher priority uplink channel and a lower priority uplink channel. Establishing which uplink channel has a higher priority over another uplink channel may be accomplished in a number of ways. For example, a priority may be indicated by the physical layer signaling (e.g., by a bit in the DCI, RNTI, CORESET, DCI format, search space set).

In some cases, priorities may be assigned to a channel based on the channel or transmission type (e.g., service type or control information type) for each of the rules described herein. In some cases, the prioritization of some channels may vary across different rules. In some examples, channel priority may be assigned based on service type, and low latency communications (e.g., URLLC transmissions) may have a higher priority than mobile broadband communications. In some examples, channel priority may be assigned based on transmission type, and feedback information (e.g., HARQ ACK codebook(s)) may have a higher priority than UCI or scheduling requests. In some examples, channel priority may be assigned based on physical channel type, and a shared channel (e.g., PUSCH) may have a higher priority than a control channel (e.g., PUCCH). In some cases, the prioritization of channels may include a combination of considerations (e.g., service type, transmission type, and physical channel type).

Additionally, or alternatively, a priority of a channel may be explicitly determined based on a search space or control resource set (CORESET) that may be associated with a specific service type. Additionally, or alternatively, a priority may be determined based on a bandwidth part (BWP) of a channel, where the BWP may be associated with a specific service type. Additionally, or alternatively, a priority may be determined based on a radio network temporary identifier (RNTI) masking associated with the service type. Additionally, or alternatively, a priority may be determined based on a scrambling of a downlink control channel (e.g., PDCCH) associated with the service type, or may even be based on a TRP identifier (ID).

In some cases, a priority may be determined implicitly. For example, UE 115-*a* may determine a block error rate (BLER) for a channel state calculation. UE 115-*a* may determine a priority for the channel state calculation based on the determined BLER (e.g., a lower BLER may correspond to a higher priority). In other cases, UE 115-*a* may determine a priority based on whether a RNTI is configured for a service. For example, a new RNTI for a service may not be configured. In this example, UE 115-*a* may determine a modulation and coding scheme (MCS) (e.g., 64QAM) based on a received MCS table. UE 115-*a* may also detect DCI formats (formats 0_0, 1_0, 0_1, 1_1, etc.) from a UE-specific search space. Based on the detected formats and determined MCS, UE 115-*a* may determine a priority for a service. In another example, RNTI may be configured for a service. Channel state feedback requests (e.g., DCI messaging) triggering channel state calculations may be scrambled by the configured RNTI. UE 115-*a* may determine a priority for a service based on the configured RNTI.

Priority rules may be established to determine the priority level (e.g., a relative priority) of a CSI report with respect to other transmissions. In particular, the priority level of the CSI report may be based on the CSI report type, such as periodic, semi-persistent, or aperiodic CSI report types. These priority rules based on CSI report type are summarized below in Table 1 and described in more detail herein. For example, periodic-CSI and semi-persistent CSI on a PUCCH may have a priority that is always lower than the priority of low latency (e.g., URLLC) uplink channels (e.g., URLLC SR, HARQ-ACK, or PUSCH). In some cases, lower priority than the priority of low latency (e.g., URLLC) uplink channels may correspond to the priority group of eMBB channels.

For aperiodic-CSI on a PUSCH (with or without data), its priority may be determined by the priority of the uplink grant that schedules the PUSCH. The uplink grant may dynamically indicate (e.g., via a physical layer indication) the priority level of the respective scheduled PUSCH, and the aperiodic-CSI may follow the same priority as the scheduled PUSCH. For example, if the aperiodic-CSI is scheduled to be transmitted on an URLLC PUSCH, then the aperiodic-CSI may have the same priority as an URLLC uplink transmission. In this case, the aperiodic-CSI may be multiplexed with other URLLC uplink UCI (e.g., URLLC HARQ-ACK) and may be transmitted on the URLLC PUSCH. In another example, if the aperiodic-CSI is scheduled to be transmitted on an eMBB PUSCH, then the aperiodic-CSI may have the same priority as an eMBB uplink transmission. In this case, the aperiodic-CSI may be multiplexed with other eMBB uplink UCI (e.g., eMBB HARQ-ACK) and may be transmitted on the eMBB PUSCH.

Semi-persistent CSI on a PUSCH (with or without data), may determine a priority level by following the rules of periodic-CSI or aperiodic-CSI. For example, semi-persistent-CSI on a PUSCH may follow priority rules of periodic-CSI and may have a priority that is always lower than the priority of low latency (e.g., URLLC) uplink channels (e.g., URLLC SR, HARQ-ACK, or PUSCH). In some cases, the lower priority than the priority of low latency (e.g., URLLC) uplink channels may correspond to the priority group of eMBB channels. In another example, semi-persistent-CSI on a PUSCH may follow priority rules of aperiodic-CSI and may be determined by the priority of the uplink grant that schedules the PUSCH. For instance, if the semi-persistent-CSI is scheduled to be transmitted on an URLLC PUSCH, then the semi-persistent-CSI may have the same priority as an URLLC uplink transmission. In this case, the semi-persistent-CSI may be multiplexed with other URLLC uplink UCI (e.g., HARQ-ACK). In another case, if the semi-persistent-CSI is scheduled to be transmitted on an eMBB PUSCH, then the semi-persistent-CSI may have the same priority as an eMBB uplink transmission. In this case, the semi-persistent-CSI may be multiplexed with other eMBB uplink UCI (e.g., HARQ-ACK).

TABLE 1

| CSI Report Type | CSI Report Priority Level |
| --- | --- |
| Periodic | Always lower priority than URLLC |
| Aperiodic | Follows priority of uplink grant |
| Semi-Persistent on PUCCH | Always lower priority than URLLC |
| Semi-Persistent on PUSCH | Always lower priority than URLLC or follows priority of uplink grant |

Some options for handling the collision between multiple overlapping channels (e.g., two or more channels of the same priority) may include resolving the collisions among the channels of the same priority first. For example, lower priority control (e.g., channel state information (CSI)) may be multiplexed or dropped to allow higher priority HARQ codebooks to be transmitted. A collision resolution configuration may include resolving collisions among the channels of the same service type first. For example, low priority eMBB channels may be multiplexed together or dropped to allow higher priority eURLLC channel(s) to be transmitted. In some cases, a collision resolution configuration may include resolving collisions across all of the channels of all priorities at once.

In some examples, collisions may be resolved by dropping or rescheduling overlapping information from the lower priority transmission(s) or channel(s) in consideration of the higher priority transmission(s) or channel(s), or by multiplexing or piggybacking overlapping information from a first priority transmission(s) or channel(s) with a second priority transmission(s) or channel(s). For example, transmissions on lower priority channels may be dropped. Thus, a UE 115-a may determine a priority of the overlapping channels, and then communicate on the highest priority channels. The UE 115-a may apply prioritization rules of a collision resolution configuration (e.g., based on service type) to various situations where uplink transmissions overlap. Additionally, or alternatively, the collision resolution configuration rules described herein may be applied to PUCCH collisions as well as PUCCH and PUSCH collision.

In some cases, a PUCCH carrying HARQ-ACK for URLLC (associated with a first codebook of a first priority), which may include other UCI, and a PUCCH carrying HARQ-ACK for eMBB (associated with a second codebook of a second priority lower than the first priority), which may include other UCI, may be resolved first regardless of the presence of the other channels. In some examples, both PUCCHs may be transmitted if the associated resources for each PUCCH are not overlapping. Alternatively, the PUCCHs may be multiplexed together in a single PUCCH channel and transmitted (e.g., if a portion of the resources are overlapping).

According to some aspects, if the resulting PUCCH resource (e.g., the resources for transmitting a single PUCCH (e.g., having multiplexed information for multiple PUCCHs) or both of the PUCCHs individually (e.g., each PUCCH carrying respective HARQ-ACK information corresponding to separate codebooks and potentially other UCI)) do not collide with resources allocated for other channels, the other channels may also be transmitted. If the resulting PUCCH resource collides with another PUCCH resource carrying CSI or other UCI, the PUCCH carrying CSI or other UCI is dropped. If the resulting PUCCH resource collides with a data channel for eMBB (e.g., eMBB PUSCH), either the data channel is dropped or the HARQ-ACK information for the multiple codebooks is piggybacked on the data channel. In some cases, a UE 115-a may determine to either drop the data channel or piggyback the HARQ-ACK information based on an indication from the network (e.g., a configuration from the base station).

If the resulting PUCCH resource collides with a data channel for URLLC (e.g., URLLC PUSCH), either the HARQ-ACK information is piggybacked on the data channel (or the PUCCH is multiplexed with the data channel and transmitted together), a portion of the eMBB HARQ-ACK bits is dropped or bundled before multiplexing on the data channel, or the eMBB PUCCH (e.g., the eMBB HARQ-ACK information) is dropped. If the resulting PUCCH resource collides with a data channel and another PUCCH carrying CSI, drop the PUCCH carrying CSI is dropped and the UE 115-a may follow the above procedure(s). That is, the HARQ-ACK information is piggybacked on the data channel (or the PUCCH is multiplexed with the data channel and transmitted together), a portion of the eMBB HARQ-ACK bits is dropped or bundled before multiplexing on the data channel, or the eMBB PUCCH (e.g., the eMBB HARQ-ACK information) is dropped based on whether the resulting PUCCH resource collides with the data channel.

In some examples, uplink control information (UCI) may be grouped based on priority of the corresponding channel, and then, any collisions of each priority group of UCI may be resolved. In each priority group, all overlapping UCI may be multiplexed into a group UCI. If the group UCI overlaps with a PUSCH of the same priority, then at least a portion of the group UCI may be piggybacked onto the corresponding PUSCH. For instance, a first priority group UCI may overlap with a PUSCH of the same, first, priority, and a second priority group UCI may overlap with a PUSCH of the same, second, priority. The first priority UCI group (e.g., URLLC PUCCH) may be piggybacked onto the first priority PUSCH (e.g., URLLC PUSCH), and the second priority UCI group (e.g., eMBB PUCCH) may be piggybacked onto the second priority PUSCH (e.g., eMBB PUSCH). Both the first and second priority PUSCHs (e.g., URLLC and eMBB PUSCHs) may then be transmitted at the same time (e.g., on different component carriers) or at different times.

According to some aspects, the collision resolution configuration may define how to resolve or handled collisions between different channels, different priorities, or different service types, and in what order the collisions are to be resolved. Thus, once the UE 115-a performs a collision resolution operation according to the collision resolution configuration, the UE 115-a does not need to go back and re-evaluate its decision. For example, the UE 115-a may first resolve collision between channels of the same service type (e.g., eMBB or URLLC), which may involve multiplexing CSI and feedback information for channels of the same service type. If the resulting PUCCH containing the multiplexed CSI and feedback information overlaps with higher priority channel (e.g., of a higher priority service type), the resulting PUCCH is dropped and the UE 115-a does not go back to drop CSI and perform multiplexing again. Such techniques may simplify operations at the UE 115-a, which may decrease latency and increase communication efficiency.

Figure 3A:
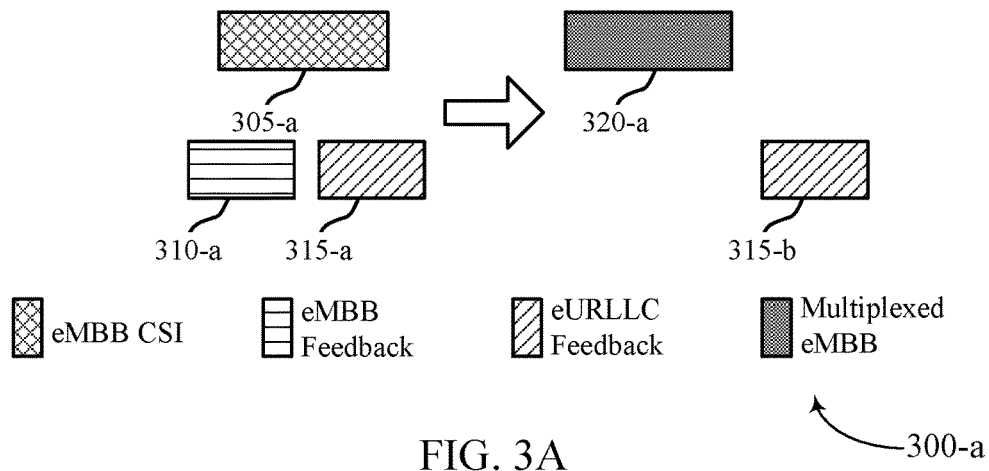
FIGS. 3A through 3C illustrate example communication schemes that support uplink collision handling in accordance with aspects of the present disclosure.

FIG. 3A illustrates an example of a communication scheme 300-a that supports uplink collision handling for a wireless communications system in accordance with aspects of the present disclosure. The communication scheme 300-a depicts an eMBB CSI uplink channel 305-a, an eMBB feedback uplink channel 310-a, an eURLLC feedback uplink channel 315-a and 315-b, and a multiplexed eMBB uplink channel 320-a. While eMBB and eURLLC are shown, other service types and transmission of different priority levels (based on type of information being carried, channel type, etc.) may be considered without departing from the scope of the present disclosure.

According to some aspects, priorities may be assigned to each uplink channel 305, 310, 315, and 320 based on the channel or transmission type (e.g., service type, channel type, or control information type) based on the rules or collision resolution configurations described herein. In some cases, the prioritization of some channels may vary across different rules. In some examples, channel priority may be assigned based on service type, and low latency communications (e.g., URLLC transmissions) may have a higher priority than mobile broadband communications. In some examples, channel priority may be assigned based on transmission type, and feedback information (e.g., HARQ ACK codebook(s)) may have a higher priority than UCI or scheduling requests. In some examples, channel priority may be assigned based on physical channel type, and a shared channel (e.g., PUSCH) may have a higher priority than a control channel (e.g., PUCCH) or vice versa. In some cases, the prioritization of channels may include a combination of considerations (e.g., service type, transmission type, and physical channel type).

In some examples, the collision of multiple prioritized channels may be resolved by first resolving the collisions of channels having the same service type (e.g., eMBB channels or eURLLC channels) or priority level (e.g., channels associated with HARQ-ACK feedback or data channels having the same priority level (e.g., as indicated through physical layer signaling)). In one example, and as shown in FIG. 3A, the eMBB CSI uplink channel 305-a overlaps the eMBB feedback uplink channel 310-*a* and the eURLLC feedback uplink channel 315-*a*. In some cases, the eMBB feedback uplink channel 310-*a* and the eURLLC feedback uplink channel 315-*a* may also overlap. In this example, the collision resolution configuration may specify that the eMBB CSI uplink channel 305-*a* and the eMBB feedback uplink channel 310-*a* may be multiplexed to form multiplexed eMBB uplink channel 320-*a*. In some cases, the multiplexed eMBB uplink channel 320-*a* may be an eMBB PUCCH. The multiplexed eMBB uplink channel 320-*a* and the eURLLC feedback uplink channel 315-*b* are then evaluated for collision resolution based on the collision resolution configuration.

Upon evaluation, the multiplexed eMBB uplink channel 320-*a* and the eURLLC feedback uplink channel 315-*b* do not overlap (e.g., in time), and both the multiplexed eMBB uplink channel 320-*a* and the eURLLC feedback uplink channel 315-*b* may be transmitted. Example cases of when collisions between the multiplexed eMBB uplink channel 320 and the eURLLC feedback uplink channel 315 do occur are discussed below with reference to FIGS. 3B and 3C.

In this example, although collision is resolved first for eMBB channels, the same collision resolution process shown and described by FIG. 3A may be performed for channels having higher priority (e.g., eURLLC channels). Thereafter, collision should be resolved across any remaining channels (e.g., lower priority channels such as those associated with a different service type or data channels having a lower priority). Further, collisions across channels of the same priority may be resolved (e.g., multiplexed and/or dropped) according to a multiplexing timeline that may be preconfigured, indicated to a UE through signaling from the network, or may be associated with a given priority level, channel type, or service type such that the multiplexing timeline is satisfied. In some cases, if the multiplexing timeline is not satisfied, an error may occur.

Figure 3B:
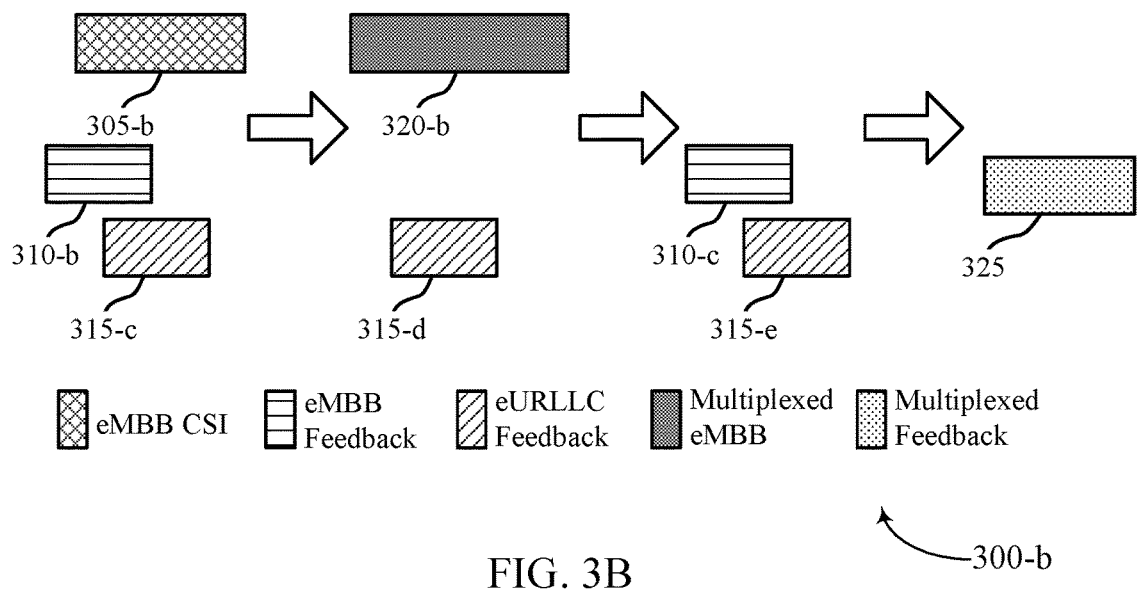

FIG. 3B illustrates an example of a communication scheme 300-*b* that supports uplink collision handling for a wireless communications system in accordance with aspects of the present disclosure. The communication scheme 300-*b* depicts an eMBB CSI uplink channel 305-*b*, an eMBB feedback uplink channel 310-*b* and 310-*c*, an eURLLC feedback uplink channel 315-*c*, 315-*d*, and 315-*e*, a multiplexed eMBB uplink channel 320-*b*, and a multiplexed feedback uplink channel 325. While eMBB and eURLLC are shown, other service types and transmission of different priority levels (based on type of information being carried, channel type, etc.) may be considered without departing from the scope of the present disclosure.

In some examples, the collision of multiple prioritized channels may be resolved by first resolving the collisions of the same service type channels (e.g., eMBB channels). As shown, the eMBB CSI uplink channel 305-*b* overlaps (e.g., collides with) the eMBB feedback uplink channel 310-*b* and the eURLLC feedback uplink channel 315-*c*, and the eMBB feedback uplink channel 310-*b* and the eURLLC feedback uplink channel 315-*c* also overlap. In this example, the eMBB CSI uplink channel 305-*b* and the eMBB feedback uplink channel 310-*b* may be multiplexed to form multiplexed eMBB uplink channel 320-*b*. In some cases, the multiplexed eMBB uplink channel 320-*b* may be an eMBB PUCCH. The multiplexed eMBB uplink channel 320-*b* and the eURLLC feedback uplink channel 315-*d* are then evaluated for collision resolution.

The multiplexed eMBB uplink channel 320-*b* and the eURLLC feedback uplink channel 315-*d* do overlap (e.g., in time), and their collision should be resolved. This may be done by dropping the multiplexed eMBB uplink channel 320-*b*. Once the multiplexed eMBB uplink channel 320-*b* is dropped, it may be useful to still transmit some eMBB UCI information (e.g., eMBB HARQ-ACK or eMBB SR). Thus, the eMBB feedback uplink channel 310-*c* and the eURLLC feedback uplink channel 315-*e* are evaluated for collision resolution. The eMBB feedback uplink channel 310-*c* and the eURLLC feedback uplink channel 315-*e* may be multiplexed to form the multiplexed feedback uplink channel 325 based on the two channels, eMBB feedback uplink channel 310-*c* and eURLLC feedback uplink channel 315-*e*, colliding. The remaining eMBB UCI information (e.g., eMBB CSI uplink channel 305-*b*) may not be scheduled for transmission with the multiplexed feedback uplink channel 325.

Figure 3C:
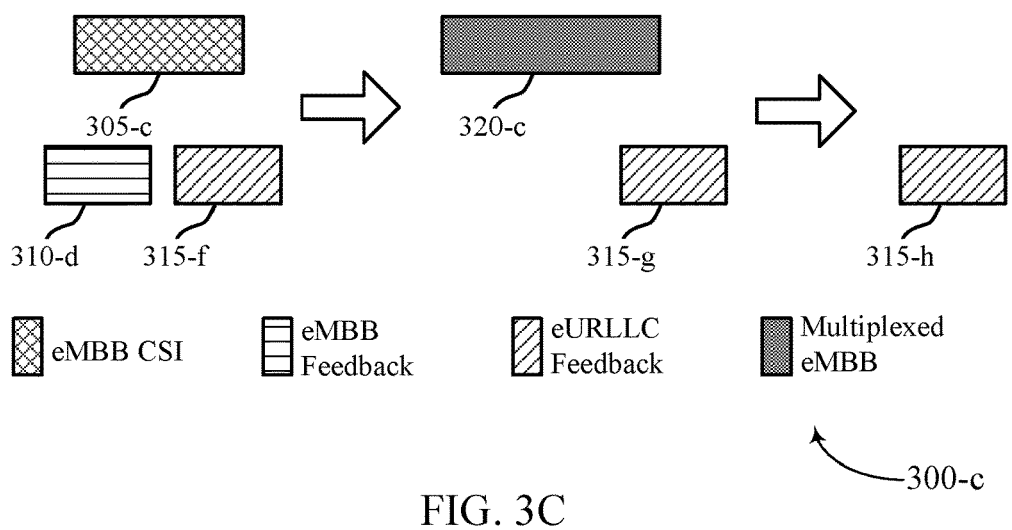

FIG. 3C illustrates an example of a communication scheme 300-*c* that supports uplink collision handling for a wireless communications system in accordance with aspects of the present disclosure. The communication scheme 300-*c* depicts an eMBB CSI uplink channel 305-*c*, an eMBB feedback uplink channel 310-*d*, an eURLLC feedback uplink channel 315-*f*, 315-*g*, and 315-*h*, and a multiplexed eMBB uplink channel 320-*c*. While eMBB and eURLLC are shown, other service types and transmission of different priority levels (based on type of information being carried, channel type, etc.) may be considered without departing from the scope of the present disclosure.

In some examples, the collision of multiple prioritized channels may be resolved by first resolving the collisions of the same service type channels (e.g., eMBB channels) according to a collision resolution configuration. As shown, the eMBB CSI uplink channel 305-*c* overlaps (e.g., collides with) the eMBB feedback uplink channel 310-*d* and the eURLLC feedback uplink channel 315-*f*. In some examples, the eMBB feedback uplink channel 310-*d* and the eURLLC feedback uplink channel 315-*f* may also overlap. In this example, the eMBB CSI uplink channel 305-*c* and the eMBB feedback uplink channel 310-*d* may be multiplexed to form multiplexed eMBB uplink channel 320-*c*. In some cases, the multiplexed eMBB uplink channel 320-*c* may be an eMBB PUCCH. The multiplexed eMBB uplink channel 320-*c* and the eURLLC feedback uplink channel 315-*g* are then evaluated for collision resolution.

The multiplexed eMBB uplink channel 320-*c* and the eURLLC feedback uplink channel 315-*g* do overlap (e.g., in time), and their collision may be resolved according to the collision resolution configuration. This may be done by dropping the multiplexed eMBB uplink channel 320-*b*, and not including eMBB information (e.g., eMBB CSI or UCI) with the transmission of the eURLLC feedback uplink channel 315-*h*. In some cases, some or all of the eMBB information may not be included due to transmission timing constraints.

Alternatively, collisions may be resolved according to the collision resolution configuration by considering the multiplexed eMBB uplink channel 320-*c*. If the multiplexed eMBB uplink channel 320-*c* overlaps eURLLC feedback uplink channel 315-*g*, eMBB CSI uplink channel 305-*c* may be dropped and if the remaining channels (e.g., eMBB feedback uplink channel 310-*d* and eURLLC feedback uplink channel 315-*f*) do not overlap, as shown in the example of FIG. 3C, the remaining channels may be transmitted. If the remaining channels overlap (e.g., in time), eMBB feedback uplink channel 310-*d* may be dropped and eURLLC feedback uplink channel 315-*f* may be transmitted. Alternatively, eMBB feedback uplink channel 310-*d* may be multiplexed with eURLLC feedback uplink channel 315-*f* and transmitted.

In some cases, collision resolution configuration may specify collision handling based on target thresholds. For example, eMBB CSI uplink channel 305-c may include a CSI report associated with a CSI process having a configured target BLER of a given threshold. If the given threshold is a first value (e.g., 10%), the CSI process may correspond to a low priority CSI process and eMBB CSI uplink channel 305-c may be dropped. If the given threshold is a second value (e.g., $1 \times 10^{-5}$), the CSI process may correspond to a high priority CSI process and eMBB CSI uplink channel 305-c is not dropped.

Figure 4A:
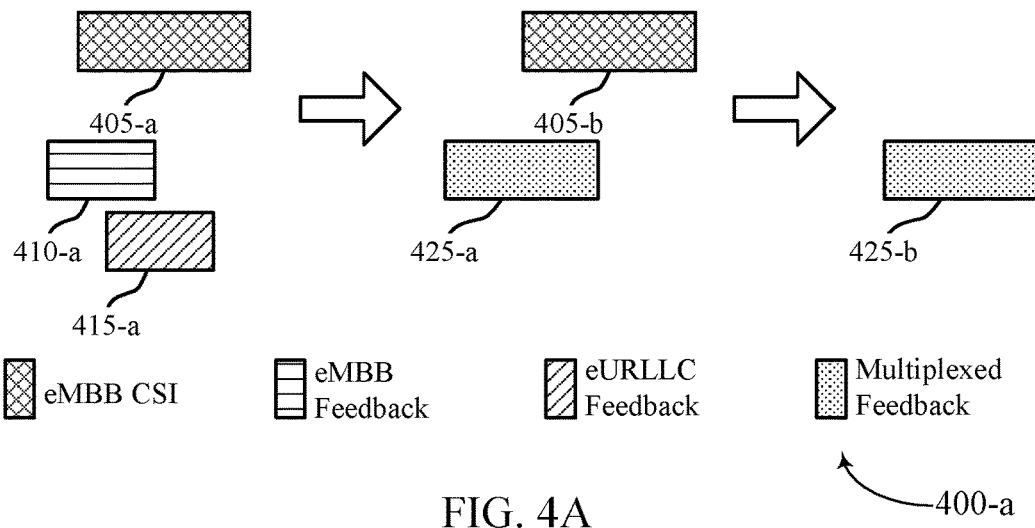
FIGS. 4A through 4C illustrate example communication schemes that support uplink collision handling in accordance with aspects of the present disclosure.

FIG. 4A illustrates an example of a communication scheme 400-a that supports uplink collision handling for a wireless communications system in accordance with aspects of the present disclosure. The communication scheme 400-a depicts an eMBB CSI uplink channel 405-a and 405-b, an eMBB feedback uplink channel 410-a, an eURLLC feedback uplink channel 415-a, and a multiplexed feedback uplink channel 425-a and 425-b. While eMBB and eURLLC are shown, other service types and transmission of different priority levels (based on type of information being carried, channel type, etc.) may be considered without departing from the scope of the present disclosure.

According to aspects of this disclosure, priorities may be assigned to each uplink channel 405, 410, 415, and 425 based on the channel or transmission type (e.g., service type or control information type) for each of the rules described herein. In some cases, the prioritization of some channels may vary across different rules. In some examples, channel priority may be assigned based on service type, and low latency communications (e.g., URLLC transmissions) may have a higher priority than mobile broadband communications. In some examples, channel priority may be assigned based on transmission type, and feedback information (e.g., HARQ ACK codebook(s)) may have a higher priority than UCI or scheduling requests. In some examples, channel priority may be assigned based on physical channel type, and a shared channel (e.g., PUSCH) may have a higher priority than a control channel (e.g., PUCCH). In some cases, the prioritization of channels may include a combination of considerations (e.g., service type, transmission type, and physical channel type).

In some examples, the collision of multiple prioritized channels may be resolved by first resolving the collisions of the same priority transmissions (e.g., feedback information is prioritized over CSI). As shown, the eMBB CSI uplink channel 405-a overlaps (e.g., collides in time with) the eMBB feedback uplink channel 410-a and the eURLLC feedback uplink channel 415-a, and the eMBB feedback uplink channel 410-a and the eURLLC feedback uplink channel 415-a also overlap. In this example, the eMBB feedback uplink channel 410-a may include an eMBB HARQ ACK codebook or a scheduling request, the eMBB feedback uplink channel 410-a and the eURLLC feedback uplink channel 415-a may be multiplexed to form multiplexed feedback uplink channel 425-a. In some cases, the multiplexed feedback uplink channel 425-a may be an eURLLC PUCCH. The multiplexed feedback uplink channel 425-a and the eMBB CSI uplink channel 405-b are then evaluated for collision resolution.

The multiplexed feedback uplink channel 425-a and the eMBB CSI uplink channel 405-b do overlap (e.g., in time), and their collision should be resolved. This may be done by dropping the eMBB CSI uplink channel 405-b, and then the multiplexed feedback uplink channel 425-b may be transmitted. An example of when collision does not occur between the multiplexed feedback uplink channel 425 and the eMBB CSI uplink channel 405 is discussed below with reference to FIG. 4B.

According to some aspects, if different channels associated with different priorities collide (e.g., if eMBB CSI uplink channel 405-a and eURLLC feedback uplink channel 415-a collide), and if multiplexing of eMBB CSI uplink channel 405-a and eMBB feedback uplink channel 410-a does not satisfy the multiplexing timeline (for transmitting feedback information for eURLLC, for example), the lower priority channel is dropped and no multiplexing is performed before transmission. For instance, eMBB CSI uplink channel 405-a may be dropped and only eMBB feedback uplink channel 410-a and eURLLC feedback uplink channel 415-a are transmitted.

Figure 4B:
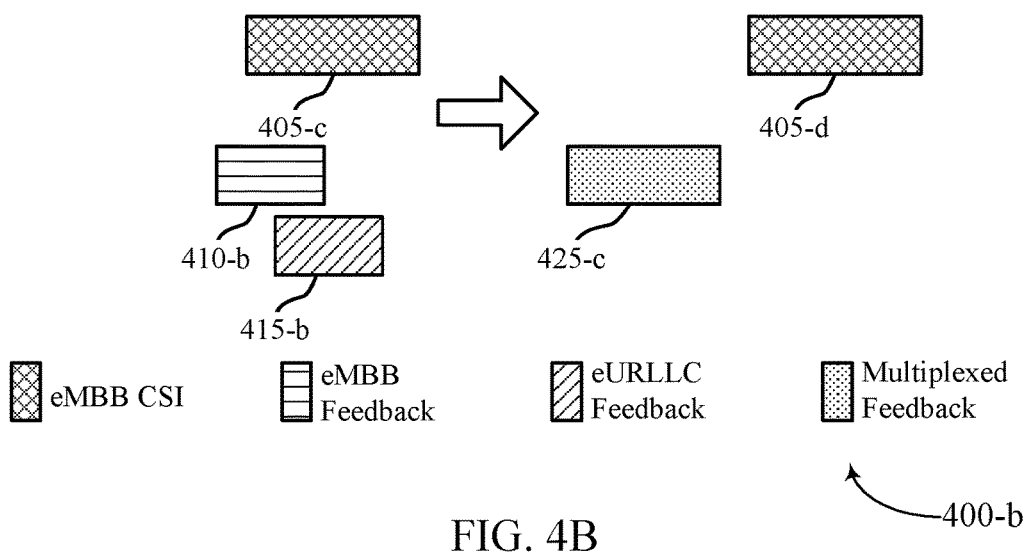

FIG. 4B illustrates an example of a communication scheme 400-b that supports uplink collision handling for a wireless communications system in accordance with aspects of the present disclosure. The communication scheme 400-b depicts an eMBB CSI uplink channel 405-c and 405-d, an eMBB feedback uplink channel 410-b, an eURLLC feedback uplink channel 415-b, and a multiplexed feedback uplink channel 425-c. While eMBB and eURLLC are shown, other service types and transmission of different priority levels (based on type of information being carried, channel type, etc.) may be considered without departing from the scope of the present disclosure.

In some examples, the collision of multiple prioritized channels may be resolved by first resolving the collisions of the same priority transmissions (e.g., feedback information is prioritized over CSI). As shown, the eMBB CSI uplink channel 405-c overlaps (e.g., collides in time with) the eMBB feedback uplink channel 410-b and the eURLLC feedback uplink channel 415-b, and the eMBB feedback uplink channel 410-b and the eURLLC feedback uplink channel 415-b also overlap. The eMBB feedback uplink channel 410-b may include a HARQ-ACK codebook or a scheduling request. In this example, the eMBB feedback uplink channel 410-b and the eURLLC feedback uplink channel 415-b may be multiplexed to form multiplexed feedback uplink channel 425-c based on their collision. In some cases, the multiplexed feedback uplink channel 425-c may be an eURLLC PUCCH. A determination may be made whether an eMBB scheduling request may be multiplexed with the eURLLC PUCCH. This determination may be configurable per logical channel, and if the eMBB scheduling request may not be multiplexed with the eURLLC PUCCH, then the eMBB scheduling request may be dropped.

The multiplexed feedback uplink channel 425-c and the eMBB CSI uplink channel 405-d are then evaluated for collision resolution. Upon evaluation, the multiplexed feedback uplink channel 425-c and the eMBB CSI uplink channel 405-d do not overlap (e.g., in time), and both the multiplexed feedback uplink channel 425-c and the eMBB CSI uplink channel 405-d may be transmitted. An example case when collision between the multiplexed feedback uplink channel 425-c and the eMBB CSI uplink channel 405-d does occur, is discussed above with reference to FIG. 4A.

Additionally, or alternatively, a PUCCH carrying eMBB CSI uplink channel 405-c may be dropped if the PUCCH carrying eMBB CSI uplink channel 405-c collides with another PUCCH carrying feedback information (e.g., higher priority information), such as eURLLC feedback uplink channel 415-b. Thereafter, eMBB feedback uplink channel 410-b and eURLLC feedback uplink channel 415-b may be multiplexed (e.g., if they collide in time) and transmitted as multiplexed feedback uplink channel 425-c.

Figure 4C:
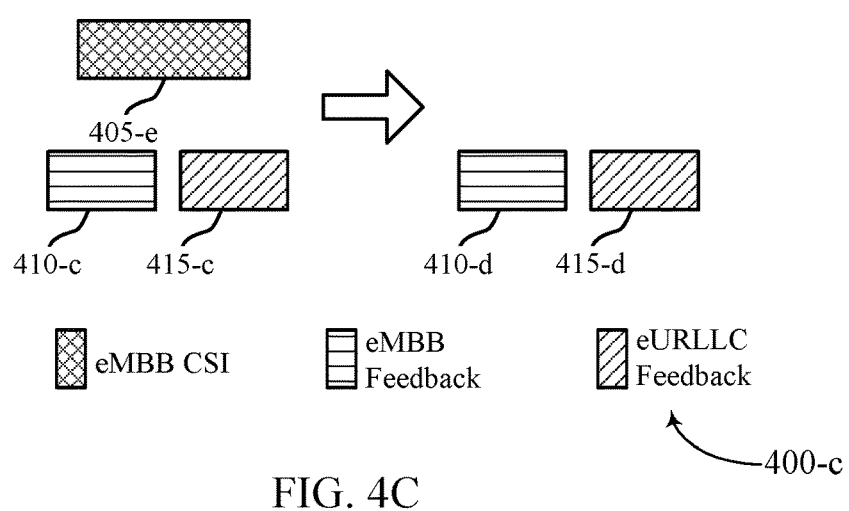

FIG. 4C illustrates an example of a communication scheme 400-c that supports uplink collision handling for a wireless communications system in accordance with aspects of the present disclosure. The communication scheme 400-c depicts an eMBB CSI uplink channel 405-e, an eMBB feedback uplink channel 410-c and 410-d, and an eURLLC feedback uplink channel 415-c and 415-d. While eMBB and eURLLC are shown, other service types and transmission of different priority levels (based on type of information being carried, channel type, etc.) may be considered without departing from the scope of the present disclosure.

In some examples, the collision of multiple prioritized channels may be resolved by first resolving the collisions of feedback information then considering overlap with CSI). As shown, the eMBB CSI uplink channel 405-e overlaps (e.g., collides in time with) the eMBB feedback uplink channel 410-c and the eURLLC feedback uplink channel 415-c. In some cases, the eMBB feedback uplink channel 410-c and the eURLLC feedback uplink channel 415-c may not overlap. In this example, the eMBB CSI uplink channel 405-e and the eURLLC feedback uplink channel 415-c may be evaluated for collision resolution. The eMBB CSI uplink channel 405-e and the eURLLC feedback uplink channel 415-c do overlap (e.g., in time), and their collision may be resolved according to the collision resolution configuration. This may be done by dropping the eMBB CSI uplink channel 405-e. Once the eMBB CSI uplink channel 405-e is dropped, the eMBB feedback uplink channel 410-d and the eURLLC feedback uplink channel 415-d may be transmitted. In this example, the eMBB information (e.g., CSI and feedback information) may not be multiplexed together or with another channel before the collision evaluation.

For FIGS. 4A through 4C, all overlapping channels are considered together. Initially, channels carrying feedback information (e.g., channels carrying HARQ-ACK information for eMBB and/or URLLC, or channels carrying HARQ-ACK information associated with different codebooks) may be resolved by multiplexing the feedback information for multiple channels into a single channel (e.g., a single PUCCH). Thereafter, channels carrying CSI having a lower priority are considered. For example, if a channel carrying CSI overlaps with the single PUCCH containing multiplexed HARQ-ACK information, the channel carrying CSI is dropped. In some examples, two channels carrying HARQ-ACK information may not overlap. If a channel carrying CSI overlaps with a higher priority channel carrying HARQ-ACK (e.g., URLLC HARQ-ACK), CSI is dropped. If the channel carrying CSI overlaps a lower priority channel carrying HARQ-ACK (e.g., eMBB HARQ-ACK), the channel carrying CSI may be multiplexed with the lower priority channel carrying HARQ-ACK or may be dropped. In the case of multiplexing, if the resulting channel overlaps with a higher priority channel (e.g., a URLLC channel), either the resulting channel is dropped, or CSI is dropped and separate channels each carrying HARQ-ACK (e.g., for different service types or associated with different codebooks), the separate channels are transmitting as they do not overlap.

Figure 5:
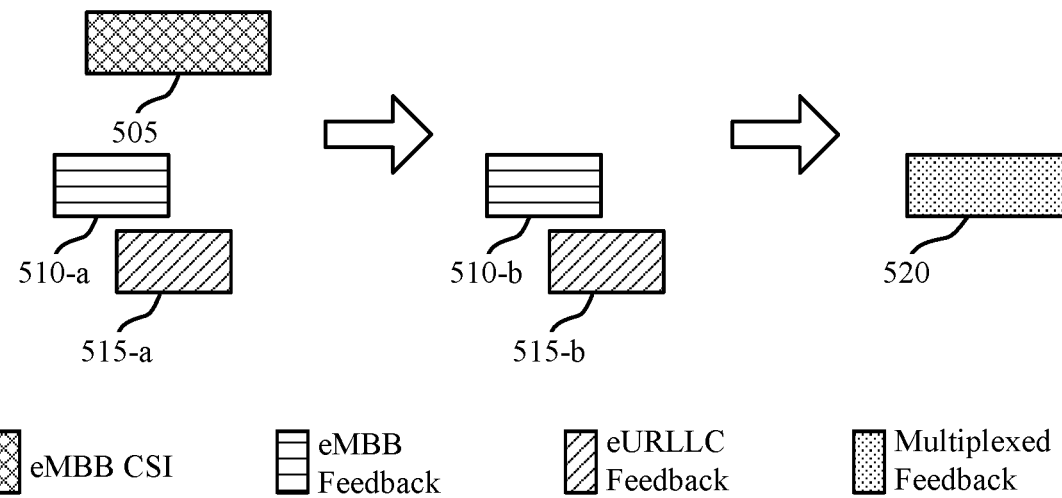
FIG. 5 illustrates an example of a communication scheme that supports uplink collision handling in accordance with aspects of the present disclosure.

FIG. 5 illustrates an example of a communication scheme 500 that supports uplink collision handling for a wireless communications system in accordance with aspects of the present disclosure. The communication scheme 500 depicts an eMBB CSI uplink channel 505, an eMBB feedback uplink channel 510-a and 510-b, an eURLLC feedback uplink channel 515-a and 515-b, and a multiplexed feedback uplink channel 520. While eMBB and eURLLC are shown, other service types and transmission of different priority levels (based on type of information being carried, channel type, etc.) may be considered without departing from the scope of the present disclosure.

According to aspects of this disclosure, priorities may be assigned to each uplink channel 505, 510, 515, and 525 based on the channel or transmission type (e.g., service type or control information type) for each of the rules described herein. In some cases, the prioritization of some channels may vary across different rules. In some examples, channel priority may be assigned based on service type, and low latency communications (e.g., URLLC transmissions) may have a higher priority than mobile broadband communications. In some examples, channel priority may be assigned based on transmission type, and feedback information (e.g., HARQ ACK codebook(s)) may have a higher priority than UCI or scheduling requests. In some examples, channel priority may be assigned based on physical channel type, and a shared channel (e.g., PUSCH) may have a higher priority than a control channel (e.g., PUCCH). In some cases, the prioritization of channels may include a combination of considerations (e.g., service type, transmission type, and physical channel type).

In some examples, the collision of multiple prioritized channels may be resolved by resolving the collisions of all of the channels at once. As shown, the eMBB CSI uplink channel 505 overlaps (e.g., collides in time with) the eMBB feedback uplink channel 510-a and the eURLLC feedback uplink channel 515-a, and the eMBB feedback uplink channel 510-a and the eURLLC feedback uplink channel 515-a also overlap. In this example, the eMBB CSI uplink channel 505 and the eURLLC feedback uplink channel 515-a may be evaluated for collision resolution. The eMBB CSI uplink channel 505 and the eURLLC feedback uplink channel 515-a do overlap (e.g., in time), and their collision should be resolved. This may be done by dropping the eMBB CSI uplink channel 505. Once the eMBB CSI uplink channel 505 is dropped, the eMBB feedback uplink channel 510-b and the eURLLC feedback uplink channel 515-b may be evaluated for collision resolution.

In some examples, the eMBB feedback uplink channel 510-b and the eURLLC feedback uplink channel 515-b may not overlap and may both be transmitted. As shown in this example, the eMBB feedback uplink channel 510-b and the eURLLC feedback uplink channel 515-b collide and may be multiplexed to form multiplexed feedback uplink channel 520 based on their collision. The multiplexed feedback uplink channel 520 may be an eURLLC PUCCH.

In some cases, the eMBB CSI uplink channel 505 may be a PUCCH carrying eMBB CSI and a scheduling request. If the scheduling request is not allowed to be transmitted on the eURLLC feedback uplink channel 515-a, the scheduling request may also be dropped when the eMBB CSI uplink channel 505 is dropped. If the scheduling request is allowed to be transmitted on the eURLLC feedback uplink channel 515-a, the scheduling request may be multiplexed into the multiplexed feedback uplink channel 520 and transmitted.

Figure 6A:
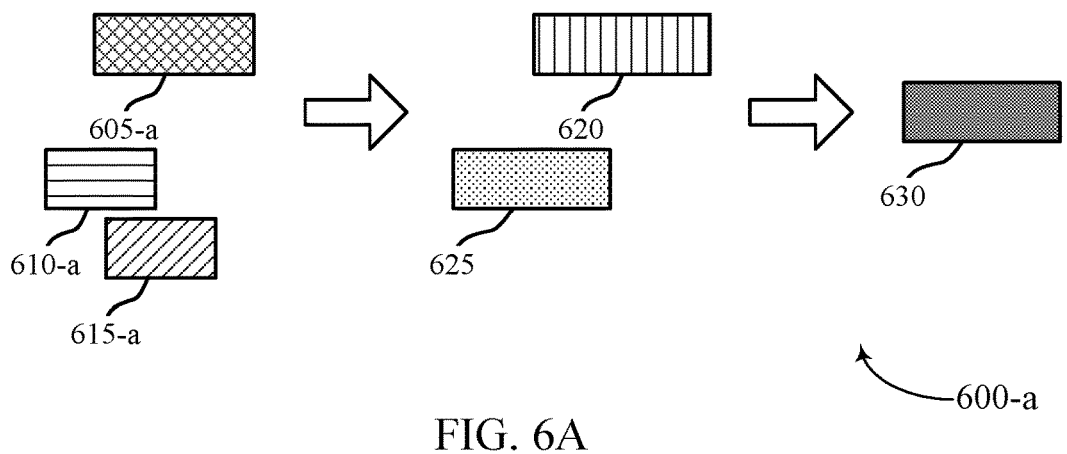
FIGS. 6A through 6C illustrate example communication schemes that support uplink collision handling in accordance with aspects of the present disclosure.

FIG. 6A illustrates an example of a communication scheme 600-a that supports uplink collision handling in accordance with aspects of the present disclosure. The communication scheme 600-a depicts a first priority uplink channel 605-a, a second priority uplink channel 610-a, and a third priority uplink channel 615-a. In the following examples, different channel types, service types, information, etc., are shown representing various priorities for uplink channels 605, 610, and 615.

In some examples, a shared channel may be present. As shown, URLLC PUSCH 605-*a* overlaps eMBB PUCCH 610-*a* and 615-*a*. eMBB PUCCH 610-*a* and 615-*a* also overlap. To handle the eMBB collision first, eMBB PUCCH 610-*a* and 615-*a* may be multiplexed to form multiplexed eMBB PUCCH 625. URLLC PUSCH 620 and multiplexed eMBB PUCCH 625 may then be evaluated based on the collision resolution configuration. URLLC PUSCH 620 and multiplexed eMBB PUCCH 625 do overlap, and URLLC PUSCH 620 may be higher priority than multiplexed eMBB PUCCH 625. Based on this prioritization, the multiplexed eMBB PUCCH 625 may be dropped and URLLC PUSCH 630 may be transmitted.

In another example, eMBB PUCCH 605-*a* may overlap URLLC PUSCH 610-*a* and URLLC PUCCH 615-*a*. URLLC PUSCH 610-*a* and URLLC PUCCH 615-*a* may also overlap. The collision between the URLLC channels may be addressed first. URLLC PUSCH 610-*a* and URLLC PUCCH 615-*a* may be multiplexed to form multiplexed URLLC PUSCH 625. Multiplexed URLLC PUSCH 625 may collide with eMBB PUCCH 620. Multiplexed URLLC PUSCH 625 may be a higher priority than eMBB PUCCH 620, and the multiplexed URLLC PUSCH 630 may be transmitted. In some cases, some eMBB UCI (e.g., an eMBB HARQ codebook) may be piggybacked on the URLLC PUSCH 630 transmission.

In another example, eMBB PUCCH 605-*a* may overlap URLLC PUSCH 610-*a* and URLLC PUCCH 615-*a*. URLLC PUSCH 610-*a* and URLLC PUCCH 615-*a* may also overlap. The collision between the service type channels may be addressed first, and eMBB PUCCH 605-*a* may be dropped. As a result, URLLC PUCCH 620 and URLLC PUSCH 625 may remain. URLLC PUCCH 620 and URLLC PUSCH 625 may have similar priorities and because they are overlapping, URLLC PUCCH 620 and URLLC PUSCH 625 may be multiplexed to form multiplexed URLLC PUSCH 630. Then, multiplexed URLLC PUSCH 630 may be transmitted.

In yet another example, URLLC PUSCH 605-*a* may collide with eMBB PUCCH 610-*a* and eMBB PUSCH 615-*a*. eMBB PUCCH 610-*a* and eMBB PUSCH 615-*a* may also collide. The collision between the eMBB channels may be handled first, and eMBB PUCCH 610-*a* and eMBB PUSCH 615-*a* may be multiplexed to form multiplexed eMBB PUSCH 625. URLLC PUSCH 620 and multiplexed eMBB PUSCH 625 may then be evaluated for collision resolution. As shown, URLLC PUSCH 620 and multiplexed eMBB PUSCH 625 overlap. URLLC PUSCH 620 may be a higher priority than eMBB PUSCH 625, and eMBB PUSCH 625 may be dropped or piggybacked onto URLLC PUSCH 630. URLLC PUSCH 630 may then be transmitted. In some cases, some eMBB UCI (e.g., an eMBB HARQ codebook or scheduling request) may be piggybacked on the URLLC PUSCH 630 transmission. In some cases, the URLLC PUSCH 620 and multiplexed eMBB PUSCH 625 collision resolution may follow a configured behavior at the UE.

In yet another example, URLLC PUCCH 605-*a* may collide with eMBB PUCCH 610-*a* and eMBB PUSCH 615-*a*. eMBB PUCCH 610-*a* and eMBB PUSCH 615-*a* may also collide. The collision between the eMBB channels may be handled first, and eMBB PUCCH 610-*a* and eMBB PUSCH 615-*a* may be multiplexed to form multiplexed eMBB PUSCH 625. URLLC PUCCH 620 and multiplexed eMBB PUSCH 625 may then be evaluated for collision resolution. As shown, URLLC PUCCH 620 and multiplexed eMBB PUSCH 625 overlap. URLLC PUCCH 620 may be a higher priority than eMBB PUSCH 625, and eMBB PUSCH 625 may be dropped or piggybacked onto URLLC PUCCH 630. URLLC PUCCH 630 may then be transmitted. In some cases, some eMBB UCI (e.g., an eMBB HARQ codebook or scheduling request) may be piggybacked on the URLLC PUCCH 630 transmission. In some cases, the URLLC PUCCH 620 and multiplexed eMBB PUSCH 625 collision resolution may follow a configured behavior at the UE.

While eMBB and eURLLC are shown, other service types and transmission of different priority levels (based on type of information being carried, channel type, etc.) may be considered without departing from the scope of the present disclosure.

Figure 6B:
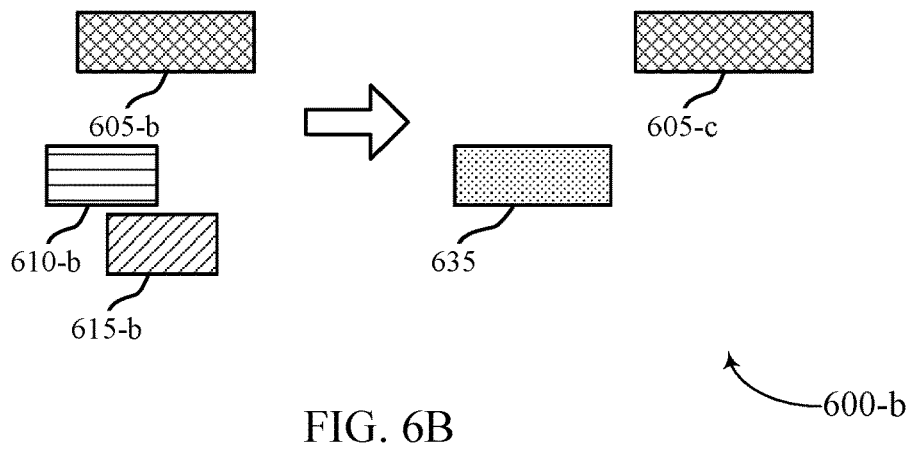

FIG. 6B illustrates an example of a communication scheme 600-*b* that supports uplink collision handling for a wireless communications system in accordance with aspects of the present disclosure. The communication scheme 600-*b* depicts a first priority uplink channel 605-*b*, a second priority uplink channel 610-*b*, and a third priority uplink channel 615-*b*.

In some examples, a shared channel may be present. As shown, URLLC PUSCH 605-*b* may overlap eMBB PUCCH 610-*b* and 615-*b*, and eMBB PUCCH 610-*b* and 615-*b* may also overlap. The eMBB collision may be solved first. eMBB PUCCH 610-*b* and 615-*b* may be multiplexed to form multiplexed eMBB PUCCH 635. Then, URLLC PUSCH 605-*c* and multiplexed eMBB PUCCH 635 may then be evaluated based on the collision resolution configuration. Both URLLC PUSCH 605-*c* and multiplexed eMBB PUCCH 635 may be transmitted since URLLC PUSCH 605-*c* and multiplexed eMBB PUCCH 635 do not collide.

In another example, URLLC PUSCH 605-*b* may collide with eMBB PUCCH 610-*b* and eMBB PUSCH 615-*b*, and eMBB PUCCH 610-*b* and eMBB PUSCH 615-*b* may also overlap. The collision between the eMBB channels may be handled first, and eMBB PUCCH 610-*b* and eMBB PUSCH 615-*b* may be multiplexed to form multiplexed eMBB PUSCH 635. URLLC PUSCH 605-*c* and multiplexed eMBB PUSCH 635 may then be evaluated for collision resolution. As shown, URLLC PUSCH 605-*c* and multiplexed eMBB PUSCH 635 do not overlap, and both channels may be transmitted.

In another example, URLLC PUCCH 605-*b* may collide with eMBB PUCCH 610-*b* and eMBB PUSCH 615-*b*, and eMBB PUCCH 610-*b* and eMBB PUSCH 615-*b* may also overlap. The collision between the eMBB channels may be handled first, and eMBB PUCCH 610-*b* and eMBB PUSCH 615-*b* may be multiplexed to form multiplexed eMBB PUSCH 635. URLLC PUCCH 605-*c* and multiplexed eMBB PUSCH 635 may then be evaluated for collision resolution. As shown, URLLC PUCCH 605-*c* and multiplexed eMBB PUSCH 635 do not overlap, and both URLLC PUCCH 605-*c* and multiplexed eMBB PUSCH 635 may be transmitted.

While eMBB and eURLLC are shown, other service types and transmission of different priority levels (based on type of information being carried, channel type, etc.) may be considered without departing from the scope of the present disclosure.

Figure 6C:
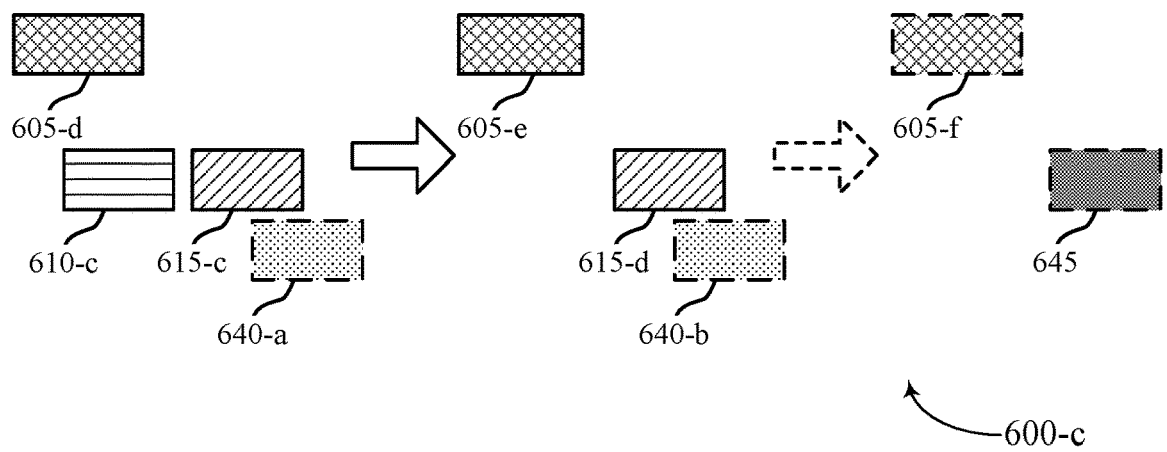

FIG. 6C illustrates an example of a communication scheme 600-*c* that supports uplink collision handling for a wireless communications system in accordance with aspects of the present disclosure. The communication scheme 600-*c* depicts a first priority uplink channel 605-*d*, a second priority uplink channel 610-*c*, a third priority uplink channel 615-*c*, and an optional fourth priority uplink channel 640-*a*.

In some examples, a shared channel may be present. As shown, URLLC PUSCH 605-d may collide with eMBB PUCCH 610-c but not with 615-c, and eMBB PUCCH 610-c and 615-c may not collide. The collision of all channels with URLLC PUSCH 605-d may be addressed first. eMBB PUCCH 610-c may be of lower priority than URLLC PUSCH 605-d, and eMBB PUCCH 610-c may be dropped in favor of URLLC PUSCH 605-d. Both URLLC PUSCH 605-e and eMBB PUCCH 615-d may then be transmitted because they do not overlap. In some cases, if eMBB PUCCH 610-c contains some eMBB UCI (e.g., an eMBB HARQ codebook), some eMBB UCI (e.g., an eMBB HARQ codebook) may be piggybacked on the URLLC PUSCH 605-e transmission.

In another example, URLLC PUSCH 605-d may collide with eMBB PUCCH 610-c but not with URLLC PUCCH 615-c, and eMBB PUCCH 610-c and URLLC PUCCH 615-c may not collide. The collision of all channels with URLLC PUSCH 605-d may be addressed first. eMBB PUCCH 610-c may be of lower priority than URLLC PUSCH 605-d, and eMBB PUCCH 610-c may be dropped in favor of URLLC PUSCH 605-d. Then, URLLC PUSCH 605-e and URLLC PUCCH 615-d may be evaluated for collision resolution. URLLC PUSCH 605-e and URLLC PUCCH 615-d may not overlap, and both URLLC PUSCH 605-e and URLLC PUCCH 615-d may be transmitted. In some cases, if eMBB PUCCH 610-c contains some eMBB UCI (e.g., an eMBB HARQ codebook), some eMBB UCI (e.g., an eMBB HARQ codebook) may be piggybacked on the URLLC PUSCH 605-e transmission.

In yet another example, URLLC PUSCH 605-d may collide with eMBB PUCCH 610-c but not with eMBB PUSCH 615-c or optional eMBB channel (e.g., PUSCH or PUCCH) 640-a, and eMBB PUSCH 615-c does not collide with eMBB PUCCH 610-c but does collide with optional eMBB channel (e.g., PUSCH or PUCCH) 640-a. The collision of all channels with URLLC PUSCH 605-d may be addressed first. eMBB PUCCH 610-c may be of lower priority than URLLC PUSCH 605-d, and eMBB PUCCH 610-c may be dropped in favor of URLLC PUSCH 605-d. The remaining URLLC PUSCH 605-e does not collide with eMBB PUSCH 615-d. If eMBB channel (e.g., PUSCH or PUCCH) 640-b was not present, then URLLC PUSCH 605-e and eMBB PUSCH 615-d may be transmitted at this point.

When optional eMBB channel (e.g., PUSCH or PUCCH) 640-b is present, the collision of the eMBB channels may be handled. eMBB PUSCH 615-d and eMBB channel (e.g., PUSCH or PUCCH) 640-b may be multiplexed to form multiplexed eMBB channel (e.g., PUSCH or PUCCH) 645. URLLC PUSCH 605-f and multiplexed eMBB channel (e.g., PUSCH or PUCCH) 645 may both be transmitted because they do not overlap. In some cases, if eMBB PUCCH 610-c contains some eMBB UCI (e.g., an eMBB HARQ codebook), some eMBB UCI (e.g., an eMBB HARQ codebook) may be piggybacked on the URLLC PUCCH 605-e or optional URLLC PUSCH 605-f transmission.

In yet another example, URLLC PUCCH 605-d may collide with eMBB PUCCH 610-c but not with eMBB PUSCH 615-c or optional eMBB channel (e.g., PUSCH or PUCCH) 640-a, and eMBB PUSCH 615-c does not collide with eMBB PUCCH 610-c but does collide with optional eMBB channel (e.g., PUSCH or PUCCH) 640-a. The collision of all channels with URLLC PUCCH 605-d may be addressed first. eMBB PUCCH 610-c may be of lower priority than URLLC PUCCH 605-d, and eMBB PUCCH 610-c may be dropped in favor of URLLC PUCCH 605-d. The remaining URLLC PUCCH 605-e does not collide with eMBB PUSCH 615-d. If eMBB channel (e.g., PUSCH or PUCCH) 640-b was not present, then URLLC PUCCH 605-e and eMBB PUSCH 615-d may be transmitted at this point.

When optional eMBB channel (e.g., PUSCH or PUCCH) 640-b is present, the collision of the eMBB channels may be handled. eMBB PUSCH 615-d and eMBB channel (e.g., PUSCH or PUCCH) 640-b may be multiplexed to form multiplexed eMBB channel (e.g., PUSCH or PUCCH) 645. URLLC PUCCH 605-f and multiplexed eMBB channel (e.g., PUSCH or PUCCH) 645 may both be transmitted because they do not overlap. In some cases, if eMBB PUCCH 610-c contains some eMBB UCI (e.g., an eMBB HARQ codebook), some eMBB UCI (e.g., an eMBB HARQ codebook) may be piggybacked on the URLLC PUCCH 605-e or optional URLLC PUSCH 605-f transmission.

While eMBB and eURLLC are shown, other service types and transmission of different priority levels (based on type of information being carried, channel type, etc.) may be considered without departing from the scope of the present disclosure.

Figure 7A:
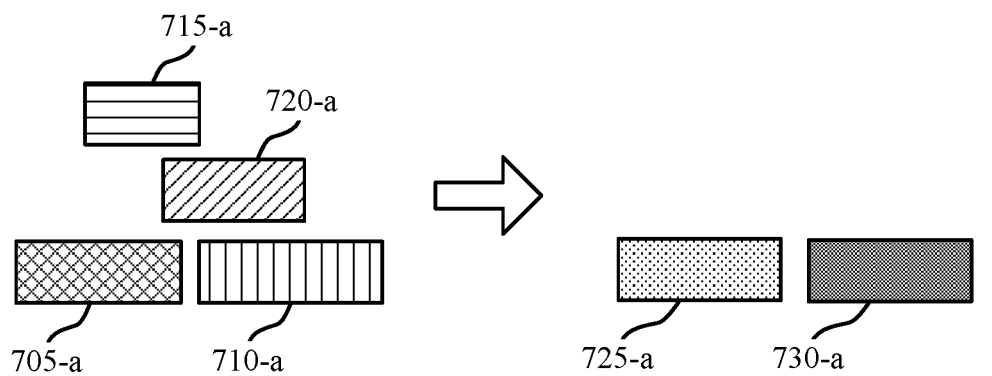
FIGS. 7A and 7B illustrate example communication schemes that support uplink collision handling in accordance with aspects of the present disclosure.

FIG. 7A illustrates an example of a communication scheme 700-a that supports uplink collision handling in accordance with aspects of the present disclosure. The communication scheme 700-a depicts a first priority uplink channel 705-a, a second priority uplink channel 710-a, a third priority uplink channel 715-a, and a fourth priority uplink channel 720-a. In the following examples, different channel types, service types, information, etc., are shown representing various priorities for uplink channels 705, 710, 715, and 720.

In some examples, a shared channel may be present. As shown, URLLC PUSCH 705-a overlaps URLLC PUCCH 715-a (e.g., URLLC UCI) in time, and eMBB PUSCH 710-a overlaps eMBB PUCCH 720-a (e.g., eMBB UCI) in time. In some cases, URLLC PUCCH 715-a and eMBB PUCCH 720-a may overlap. URLLC PUSCH 705-a and eMBB PUSCH 710-a may not overlap. The URLLC PUSCH 705-a and URLLC PUCCH 715-a collision may be mitigated first, URLLC PUCCH 715-a may be piggybacked onto URLLC PUSCH 705-a to form URLLC PUSCH 725-a. The eMBB PUSCH 710-a and eMBB PUCCH 720-a collision may be mitigated second, eMBB PUCCH 720-a may be piggybacked onto eMBB PUSCH 710-a to form eMBB PUSCH 730-a. URLLC PUSCH 725-a and eMBB PUSCH 730-a do not overlap in time, and both URLLC PUSCH 725-a and eMBB PUSCH 730-a may be transmitted.

In some cases, a UE may receive an indication of the uplink downlink assignment index (DAI) (e.g., in an uplink grant for the PUSCH) that allocates a number of bits of the UCI (e.g., URLLC PUCCH 715-a or eMBB PUCCH 720-a) to be piggybacked onto the of the shared data channel (e.g., URLLC PUSCH 705-a and eMBB PUSCH 710-a). An indication may be received for each priority of transmissions. For example, one indication may be associated with URLLC UCI for multiplexing on a corresponding URLLC PUSCH, and another indication may be associated with eMBB UCI for multiplexing on a corresponding eMBB PUSCH. In some examples, a single indication may indicate separate numbers of bits for each priority.

Figure 7B:
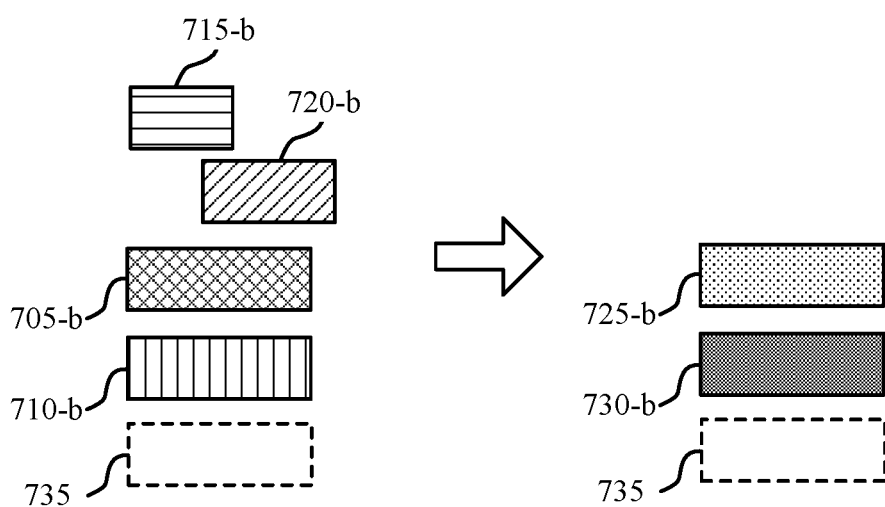

FIG. 7B illustrates an example of a communication scheme 700-b that supports uplink collision handling in accordance with aspects of the present disclosure. The communication scheme 700-b depicts a first priority uplink channel 705-b, a second priority uplink channel 710-b and 735, a third priority uplink channel 715-b, and a fourth priority uplink channel 720-b. In the following examples, different channel types, service types, information, etc., are shown representing various priorities for uplink channels 705, 710, 715, 720, and 735.

In some examples, a shared channel may be present. As shown, URLLC PUSCH 705-b overlaps URLLC PUCCH 715-b (e.g., URLLC UCI) in time, and eMBB PUSCH 710-b overlaps eMBB PUCCH 720-b (e.g., eMBB UCI) in time. In some cases, URLLC PUCCH 715-b and eMBB PUCCH 720-b may overlap in time. URLLC PUSCH 705-b, eMBB PUSCH 710-b, and optional eMBB PUSCH 735 may each be on a separate component carriers (CCs) (e.g., URLLC PUSCH 705-b on CC0, eMBB PUSCH 710-b on CC1, and optional eMBB PUSCH 735 on CC2). The URLLC PUSCH 705-b and URLLC PUCCH 715-b collision may be mitigated first, URLLC PUCCH 715-b may be piggybacked onto URLLC PUSCH 705-b to form URLLC PUSCH 725-b. The eMBB PUSCH 710-b and eMBB PUCCH 720-b collision may be mitigated second, eMBB PUCCH 720-b may be piggybacked onto eMBB PUSCH 710-b to form eMBB PUSCH 730-b. In some examples, eMBB PUSCH 710-b may be higher priority than optional eMBB PUSCH 735.

URLLC PUSCH 725-b, eMBB PUSCH 730-b, and optional eMBB PUSCH 735 may be transmitted on their respective CCs at the same time (e.g., contemporaneous transmissions). For example, the URLLC UCI may be conveyed (e.g., piggybacked) to the base station via a corresponding URLLC PUSCH transmission, and the eMBB UCI may be conveyed (e.g., piggybacked) to the base station via the corresponding eMBB PUSCH transmission, and each PUSCH transmission may be performed using respective CCs (e.g., different CCs) at the same time. In some cases, a UE may not be capable of transmitting all PUSCHs at the same time. As a result, a UE may drop one or more lower priority channels (e.g., drop eMBB PUSCH 735, eMBB PUSCH 730-b, or both), and URLLC PUSCH 725-b may be transmitted as a result of its priority being higher than eMBB PUSCH 735 and eMBB PUSCH 730-b.

In some cases, a UE may receive an indication of the uplink DAI (e.g., in an uplink grant for the PUSCH) that allocates a number of bits of the UCI (e.g., URLLC PUCCH 715-b or eMBB PUCCH 720-b) to be piggybacked onto the of the shared data channel (e.g., URLLC PUSCH 705-b and eMBB PUSCH 710-b). An indication may be received for each priority of transmissions. For example, one indication may be associated with URLLC UCI for multiplexing on a corresponding URLLC PUSCH, and another indication may be associated with eMBB UCI for multiplexing on a corresponding eMBB PUSCH. In some examples, a single indication may indicate separate numbers of bits for each priority.

Figure 8:
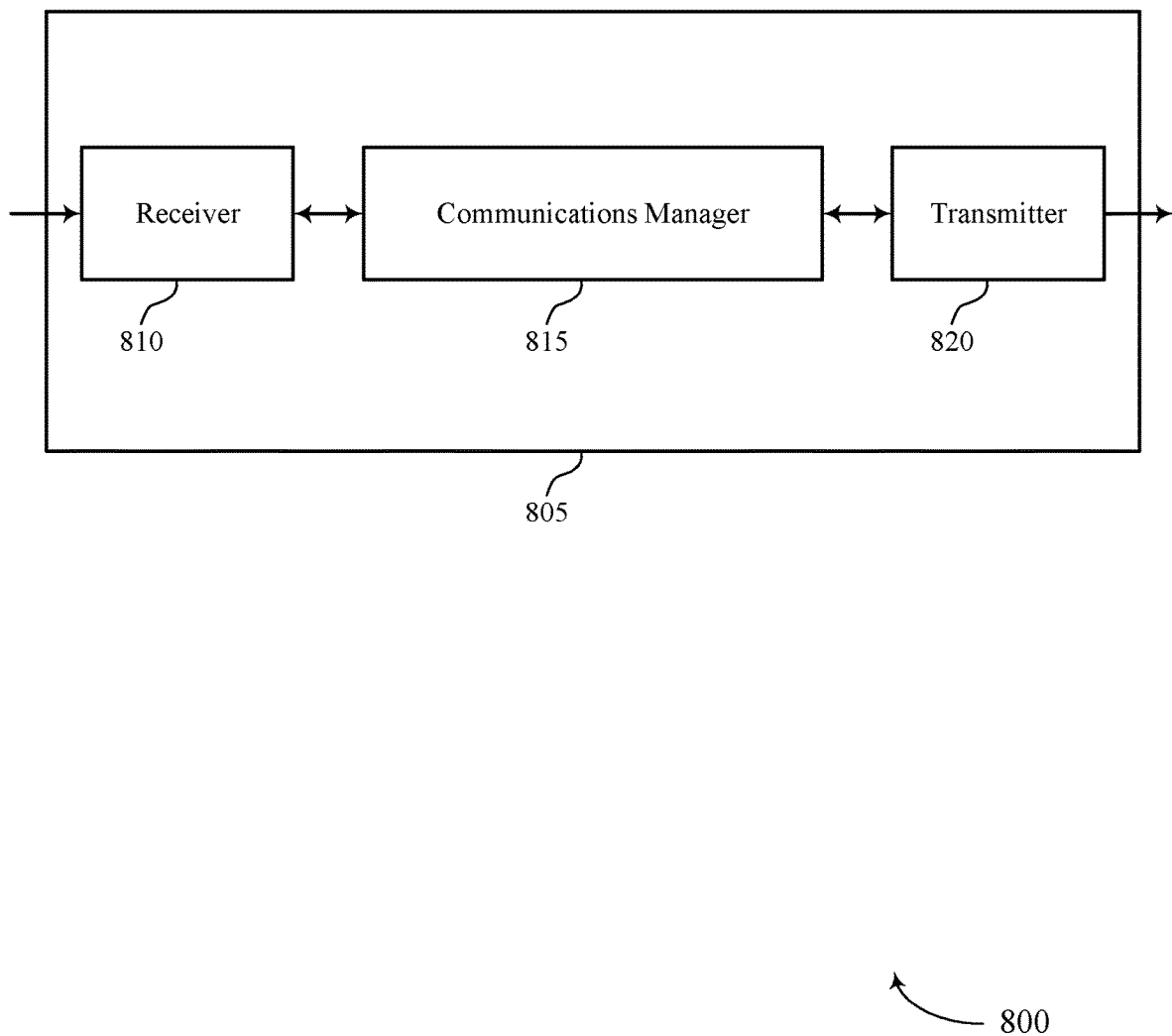
FIGS. 8 and 9 show block diagrams of devices that support uplink collision handling in accordance with aspects of the present disclosure.

FIG. 8 shows a block diagram 800 of a device 805 that supports uplink collision handling in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to uplink collision handling, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify first uplink information associated with a first priority level for transmission to a base station, identify second uplink information associated with a second priority level for transmission to the base station, determine a first set of time resources for transmission of the first uplink information and a second set of time resources for transmission of the second uplink information, determine a collision resolution configuration for transmission of the first uplink information and the second uplink information based on the first priority level and the second priority level, and transmit at least a portion of the first uplink information or the second uplink information according to the collision resolution configuration via at least a portion of the first and second sets of time resources. The communications manager 815 may be an example of aspects of the communications manager 1110 described herein.

The actions performed by the communications manager 815 as described herein may be implemented to realize one or more potential advantages. One implementation may allow a UE 115 to improve communication quality and reduce latency caused by errors in overlapping resource allocations by avoiding collisions between channels based on priority. Another implementation may provide improved reliability of service at the UE 115, as latency at the UE 115 may be reduced.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field programable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
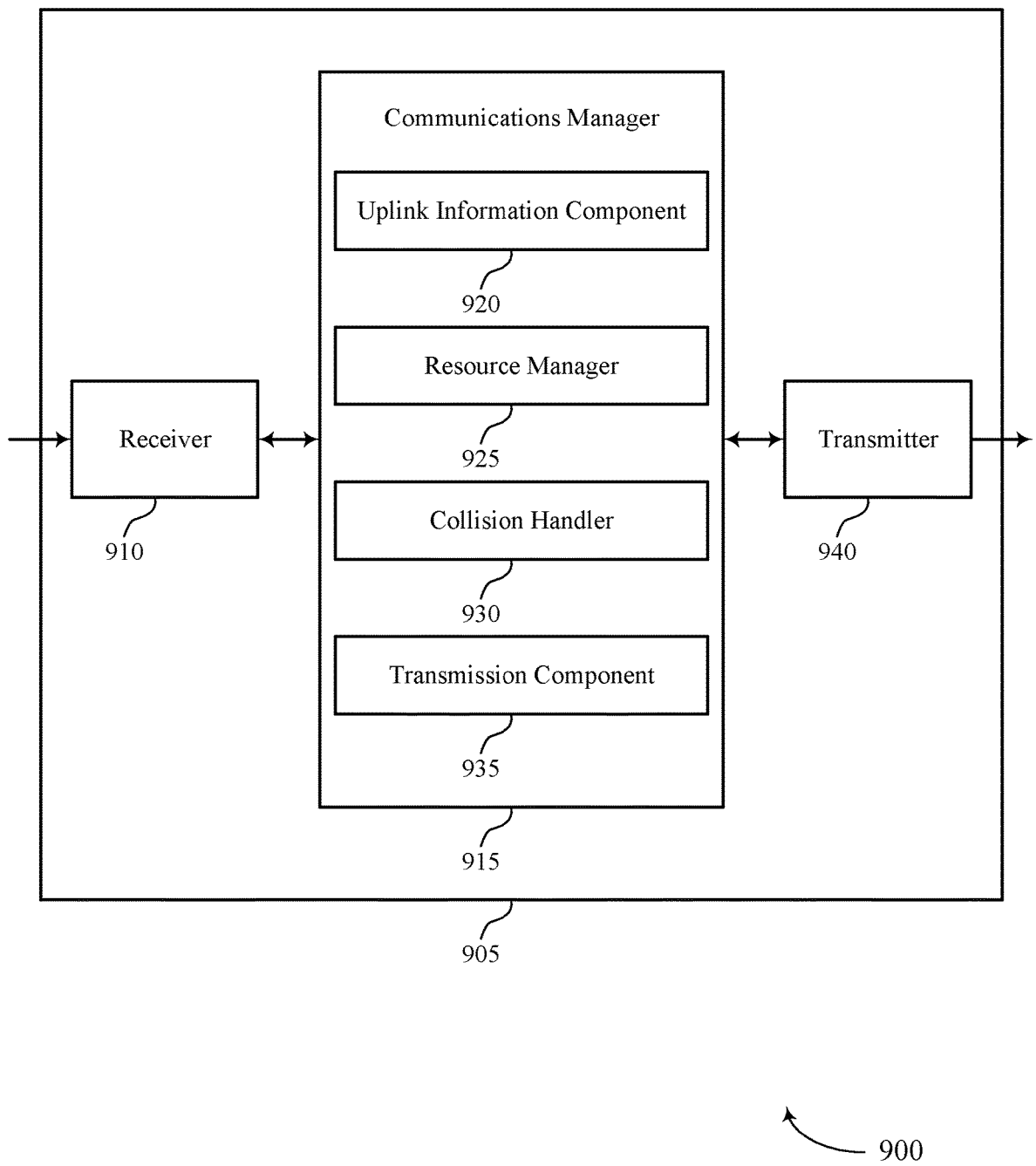

FIG. 9 shows a block diagram 900 of a device 905 that supports uplink collision handling in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to uplink collision handling, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an uplink information component 920, a resource manager 925, a collision handler 930, and a transmission component 935. The communications manager 915 may be an example of aspects of the communications manager 1110 described herein.

The uplink information component 920 may identify first uplink information associated with a first priority level for transmission to a base station and identify second uplink information associated with a second priority level for transmission to the base station. The resource manager 925 may determine a first set of time resources for transmission of the first uplink information and a second set of time resources for transmission of the second uplink information.

The collision handler 930 may determine a collision resolution configuration for transmission of the first uplink information and the second uplink information based on the first priority level and the second priority level. The transmission component 935 may transmit at least a portion of the first uplink information or the second uplink information according to the collision resolution configuration via at least a portion of the first and second sets of time resources.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
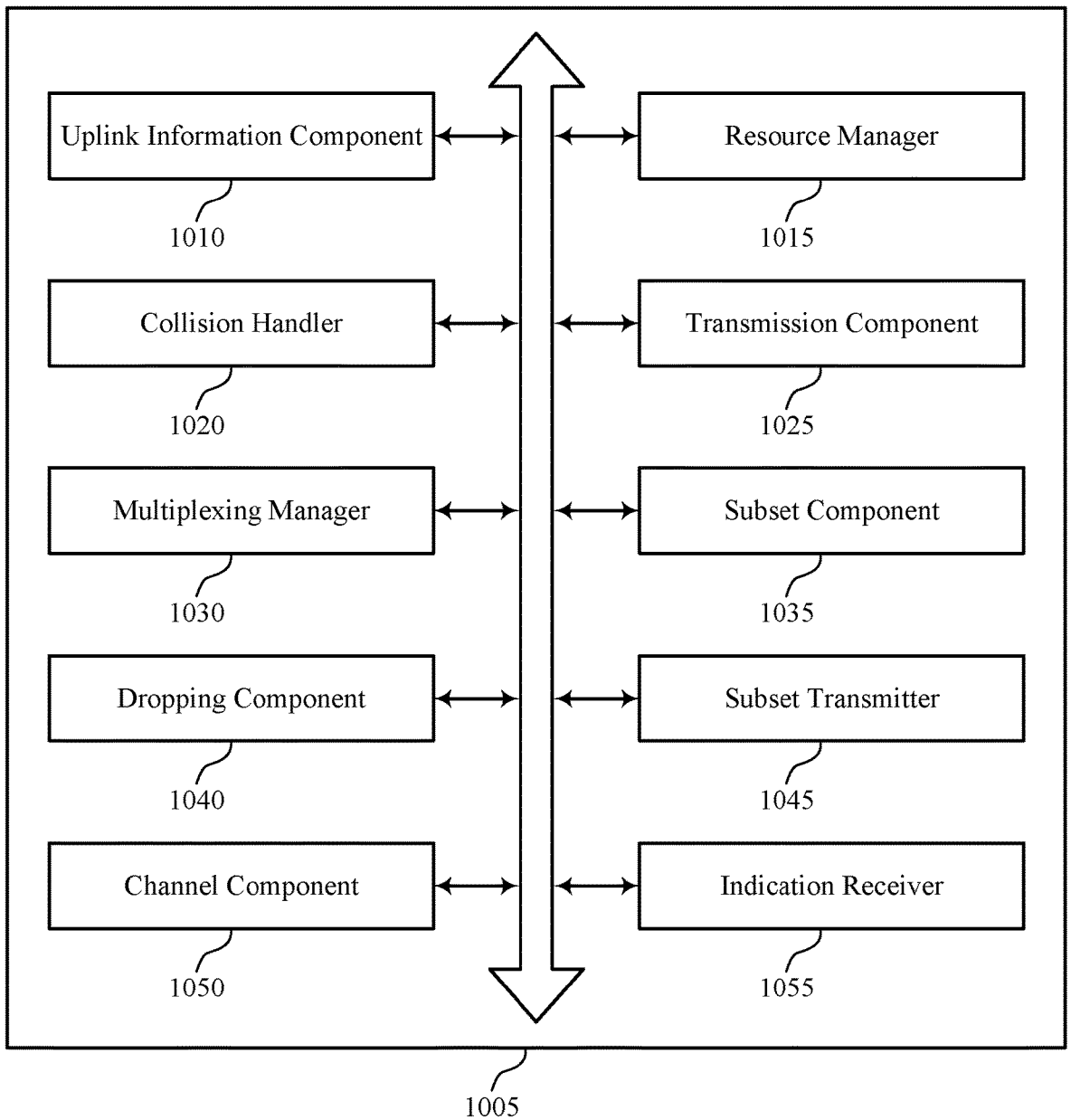
FIG. 10 shows a block diagram of a communications manager that supports uplink collision handling in accordance with aspects of the present disclosure.

FIG. 10 shows a block diagram 1000 of a communications manager 1005 that supports uplink collision handling in accordance with aspects of the present disclosure. The communications manager 1005 may be an example of aspects of a communications manager 815, a communications manager 915, or a communications manager 1110 described herein. The communications manager 1005 may include an uplink information component 1010, a resource manager 1015, a collision handler 1020, a transmission component 1025, a multiplexing manager 1030, a subset component 1035, a dropping component 1040, a subset transmitter 1045, a channel component 1050, and an indication receiver 1055. Each of these modules may communicate, directly or indirectly, with one another (e.g., via one or more buses).

The uplink information component 1010 may identify first uplink information associated with a first priority level for transmission to a base station. In some examples, the uplink information component 1010 may identify second uplink information associated with a second priority level for transmission to the base station. In some cases, the uplink information component 1010 may identify third uplink information associated with a third priority level for transmission to the base station and identify fourth uplink information associated with a fourth priority level for transmission to the base station. In some instances, the first and second priority levels are the same, and the third and fourth priority levels are the same. In some aspects, the first priority level is higher than the second priority level, and the third priority level is higher than the fourth priority level.

The uplink information component 1010 may identify the first priority level based on the first uplink information including channel state information. The uplink information component 1010 may identify that the first uplink information includes a periodic channel state information report and determine that the first priority level may be lower than a priority level of a low latency channel based on the first uplink information including the periodic channel state information report. In some cases, the first priority level may be associated with a priority level of a mobile broadband channel based on the first uplink information including the periodic channel state information report. The uplink information component 1010 may identify that the first uplink information includes a semi-persistent channel state information report included in an uplink control channel and determine that the first priority level may be lower than a priority level of a low latency channel based on the first uplink information including the semi-persistent channel state information report included in the uplink control channel.

The uplink information component 1010 may receive an uplink grant scheduling an uplink shared channel and may identify that the first uplink information includes an aperiodic channel state information report scheduled by the uplink grant for transmission on the uplink shared channel. Then, the uplink information component 1010 may determine that the first priority level may be the same as a priority level indicated by the uplink grant for the uplink shared channel. The uplink information component 1010 may identify that the first uplink information includes a semi-persistent channel state information report included in an uplink shared channel and determine that the first priority level may be lower than a priority level of a low latency channel based on the first uplink information including the semi-persistent channel state information report included in the uplink shared channel. In some cases, the uplink information component 1010 may receive an uplink grant scheduling an uplink shared channel, may identify that the first uplink information includes a semi-persistent channel state information report activated by the uplink grant for transmission on the uplink shared channel, and may determine that the first priority level may be the same as a priority level indicated by the uplink grant for the uplink shared channel.

The resource manager 1015 may determine a first set of time resources for transmission of the first uplink information and a second set of time resources for transmission of the second uplink information.

The collision handler 1020 may determine a collision resolution configuration for transmission of the first uplink information and the second uplink information based on the first priority level and the second priority level. In some examples, the collision handler 1020 may resolve collisions across channels associated the same priority level before resolving collisions across priority levels. In some examples, the collision handler 1020 may resolve collisions across all channels independent of priority level or across all channels of the same type before resolving collisions across channel types. In some cases, the collision resolution configuration indicates a multiplexing configuration for the first priority level and the second priority level, an uplink channel for the first priority level or the second priority level, a set of uplink resources for transmission of uplink information, or any combination thereof.

The transmission component 1025 may transmit at least a portion of the first uplink information or the second uplink information according to the collision resolution configuration via at least a portion of the first and second sets of time resources. In some examples, the transmission component 1025 may transmit the first uplink information over the first uplink channel via the third set of time resources and the second uplink information over a second uplink channel via the second set of time resources, where the first uplink information includes feedback information of a first HARQ codebook associated with the first priority level and the second uplink information includes feedback information of a second HARQ codebook associated with the second priority level, the second priority level higher than the first priority level.

In some examples, the transmission component 1025 may transmit the first uplink information over the first uplink channel via the third set of time resources and the second uplink information over a second uplink channel via the second set of time resources, where the first uplink channel is a first uplink shared channel associated with the first priority level and the second uplink channel is a second uplink shared channel associated with the second priority level higher than the first priority level. In some examples, the transmission component 1025 may transmit the first uplink information over the first uplink channel via the third set of time resources and the second uplink information over a second uplink channel via the second set of time resources, where the first uplink information includes channel state information associated with the first priority level and the second uplink information includes feedback information associated with the second priority level higher than the first priority level.

In some examples, the transmission component 1025 may transmit the subset of the first uplink information and all of the second uplink information over the single uplink channel via the third set of time resources, where the subset of the first uplink information includes scheduling information associated with the first priority level and the second uplink information includes feedback information associated with the second priority level higher than the first priority level. In some cases, the transmission component 1025 may transmit the second uplink information via the second set of time resources, where the second uplink information includes feedback information of a second HARQ codebook associated with the second priority level, the second priority level higher than the first priority level.

In some examples, the transmission component 1025 may transmit one or more uplink control channels associated with the first priority level based on the third set of time resources nonoverlapping with resources for the one or more uplink control channels. In some cases, the transmission component 1025 may transmit the multiplexed second uplink information and third uplink information. In some examples, the transmission component 1025 may transmit the second uplink information and third uplink information, where the third uplink information includes feedback information of a first HARQ codebook associated with the first priority level and the second uplink information includes feedback information of a second HARQ codebook associated with the second priority level higher than the first priority level.

In some examples, the transmission component 1025 may transmit the first uplink information via the third set of time resources and the second uplink information via the second set of time resources, where the first uplink information includes uplink control information associated with the first priority level and the second uplink information includes shared data associated with the second priority level higher than the first priority level. In some instances, the transmission component 1025 may transmit the second uplink information via the second set of time resources, where the second uplink information includes shared data associated with the second priority level higher than the first priority level.

In some examples, the transmission component 1025 may transmit the multiplexed first uplink information and second uplink information over the third set of time resources. In some instances, the transmission component 1025 may transmit the multiplexed uplink control information, the first uplink information, and the second uplink information. In some examples, the transmission component 1025 may transmit the multiplexed first and second uplink information. In some cases, the transmission component 1025 may transmit the multiplexed first and second uplink information. In some examples, the transmission component 1025 may transmit the second uplink information via the second set of time resources, the second uplink information including shared data or uplink control information associated with the second priority level higher than the first priority level. In some cases, the first uplink channel includes an uplink control channel.

In some aspects, the transmission component 1025 may transmit the subset of the first uplink information and all of the second uplink information over the first uplink channel via the second set of time resources. In some cases, the first uplink channel includes a first uplink shared channel associated with the first priority level. In some examples, the transmission component 1025 may transmit the subset of the third uplink information and all of the fourth uplink information over the second uplink channel via the third set of time resources. In some instances, the second uplink channel includes a second uplink shared channel associated with the third priority level.

In some aspects, the transmission component 1025 may transmit the subset of the first uplink information and all of the second uplink information over the first uplink channel via a first component carrier of the second set of time resources. In some cases, the first uplink channel includes an uplink shared channel associated with the first priority level.

In some examples, the transmission component 1025 may transmit the subset of the third uplink information and all of the fourth uplink information over the second uplink channel via a second component carrier of the second set of time resources. In some cases, the second uplink channel includes an uplink shared channel associated with the third priority level.

In some instances, the transmission component 1025 may transmit additional uplink information over a third uplink channel via a third component carrier of the second set of time resources, where the third uplink channel includes an uplink shared channel associated with a fifth priority level.

The multiplexing manager 1030 may multiplex the first uplink information on a first uplink channel associated with a third set of time resources nonoverlapping with the second set of time resources based on the collision resolution configuration. In some examples, the multiplexing manager 1030 may multiplex the second uplink information with third uplink information, where the third uplink information includes feedback information of a first HARQ codebook associated with the first priority level and the second uplink information includes feedback information of a second HARQ codebook associated with the second priority level higher than the first priority level. In some examples, the multiplexing manager 1030 may multiplex the first uplink information over a third set of time resources nonoverlapping with the second set of time resources based on the collision resolution configuration.

In some examples, the multiplexing manager 1030 may multiplex the first uplink information over a third set of time resources based on the collision resolution configuration, where the first uplink information includes uplink control information associated with the first priority level. In some examples, the multiplexing manager 1030 may multiplex the first uplink information and the second uplink information over a third set of time resources based on the collision resolution configuration, where the first uplink information includes shared data associated with the first priority level and the second uplink information includes uplink control information associated with the second priority level higher than the first priority level.

In some examples, the multiplexing manager 1030 may multiplex uplink control information associated with a third priority level with the multiplexed first and second uplink information based on the third set of time resources at least partially overlapping with a fourth set of time resources associated with the uplink control information, the third priority level being lower than the first and second priority levels. In some cases, the multiplexing manager 1030 may multiplex the first and second uplink information. In some examples, the multiplexing manager 1030 may multiplex the first uplink information and the second uplink information over a third set of time resources based on the collision resolution configuration, where the first uplink information includes shared data or uplink control information associated with the first priority level and the second uplink information includes uplink control information associated with the second priority level lower than the first priority level.

In some examples, the multiplexing manager 1030 may multiplex the aperiodic channel state information with other uplink control information also associated with the first priority level.

The subset component 1035 may multiplex a subset of the first uplink information and all of the second uplink information on a single uplink channel associated with a third set of time resources based on the collision resolution configuration. In some examples, the subset component 1035 may a subset of the first uplink information on a first uplink channel associated with a third set of time resources based on the collision resolution configuration, where the subset of the first uplink information includes feedback information of a first HARQ codebook associated with the first priority level or scheduling information associated with the first priority level.

In some examples, the subset component 1035 may multiplex a subset of the first uplink information and all of the second uplink information on a single uplink channel associated with a third set of time resources based on the collision resolution configuration, where the subset of the first uplink information includes feedback information of a first HARQ codebook associated with the first priority level or scheduling information associated with the first priority level and the second uplink information includes feedback information of a second HARQ codebook associated with the second priority level, the second priority level higher than the first priority level.

In some examples, the subset component 1035 may multiplex a subset of the first uplink information and all of the second uplink information on a single uplink channel associated with a third set of time resources based on the collision resolution configuration, where the subset of the first uplink information includes feedback information associated with the first priority level and the second uplink information includes shared data associated with the second priority level higher than the first priority level.

In some aspects, the subset component 1035 may multiplex a subset of the first uplink information and all of the second uplink information on a first uplink channel associated with the second set of time resources based at least in part on the collision resolution configuration. In some cases, the subset of the first uplink information includes feedback information associated with the first priority level and the second uplink information includes shared data.

In some examples, the subset component 1035 may multiplex a subset of the third uplink information and all of the fourth uplink information on a second uplink channel associated with a third set of time resources nonoverlapping with the second set of time resources based at least in part on the collision resolution configuration. In some cases, the subset of the third uplink information includes feedback information associated with the third priority level and the fourth uplink information includes shared data associated with the fourth priority level.

In some aspects, the subset component 1035 may multiplex a subset of the first uplink information and all of the second uplink information on a first uplink channel associated with the second set of time resources based at least in part on the collision resolution configuration, where the subset of the first uplink information includes feedback information associated with the first priority level and the second uplink information includes shared data associated with the second priority level.

In some examples, the subset component 1035 may multiplex a subset of the third uplink information and all of the fourth uplink information on a second uplink channel associated with the second set of time resources based at least in part on the collision resolution configuration, where the subset of the third uplink information includes feedback information associated with the third priority level and the fourth uplink information includes shared data associated with the fourth priority level.

The dropping component 1040 may drop the multiplexed subset of the first uplink information based on the third set of time resources at least partially overlapping with the second set of time resources. In some examples, the dropping component 1040 may drop the first uplink information based on the collision resolution configuration, the first uplink information including channel state information associated with the first priority level.

In some examples, the dropping component 1040 may drop the first uplink information based on the collision resolution configuration, the first uplink information including channel state information or scheduling information associated with the first priority level. In some cases, the dropping component 1040 may drop the multiplexed first uplink information based on the third set of time resources at least partially overlapping with the second set of time resources. In some examples, the dropping component 1040 may drop a control channel based on the third set of time resources at least partially overlapping with a fourth set of time resources associated with the control channel, the control channel associated with a third priority level lower than the first and second priority levels.

In some examples, the dropping component 1040 may drop a control channel associated with a third set of time resources that at least partially overlaps with the first or second set of time resources, the control channel associated with a third priority level lower than the first and second priority levels. In some cases, the dropping component 1040 may drop the multiplexed first and second uplink information based on the third set of time resources at least partially overlapping a fourth set of time resources associated with a shared data channel or a control channel associated with a third priority level higher than the first and second priority levels. In some examples, the dropping component 1040 may drop the first uplink information based on the first set of time resources at least partially overlapping the second set of time resources, where the first uplink information includes information associated with the first priority level. In some cases, the dropping component 1040 may drop the subset of the third uplink information and all of the fourth uplink information.

The subset transmitter 1045 may transmit the subset of the first uplink information and all of the second uplink information over the single uplink channel via the third set of time resources. In some examples, the subset transmitter 1045 may transmit the subset of the first uplink information and all of the second uplink information over the single uplink channel via the third set of time resources, where the single uplink channel includes an uplink shared channel associated with the first priority level.

The channel component 1050 may transmit a shared data channel or a control channel associated with a third priority level higher than the first and second priority levels over a fourth set of time resources nonoverlapping with the third set of time resources. In some examples, the channel component 1050 may transmit the shared data channel or the control channel over the fourth set of time resources. In some examples, the channel component 1050 may multiplex one or more channels via a third set of time resources nonoverlapping with the second set of time resources. In some examples, the channel component 1050 may transmit the multiplexed one or more channels.

The indication receiver 1055 may receive an indication of the collision resolution configuration from the base station. In some cases, the indication receiver 1055 may receive a first DAI indicating a number of feedback information bits on the first uplink channel associated with the first priority level. In some instances, the indication receiver 1055 may receive a second DAI indicating a number of feedback information bits on the second uplink channel associated with the second priority level.

Figure 11:
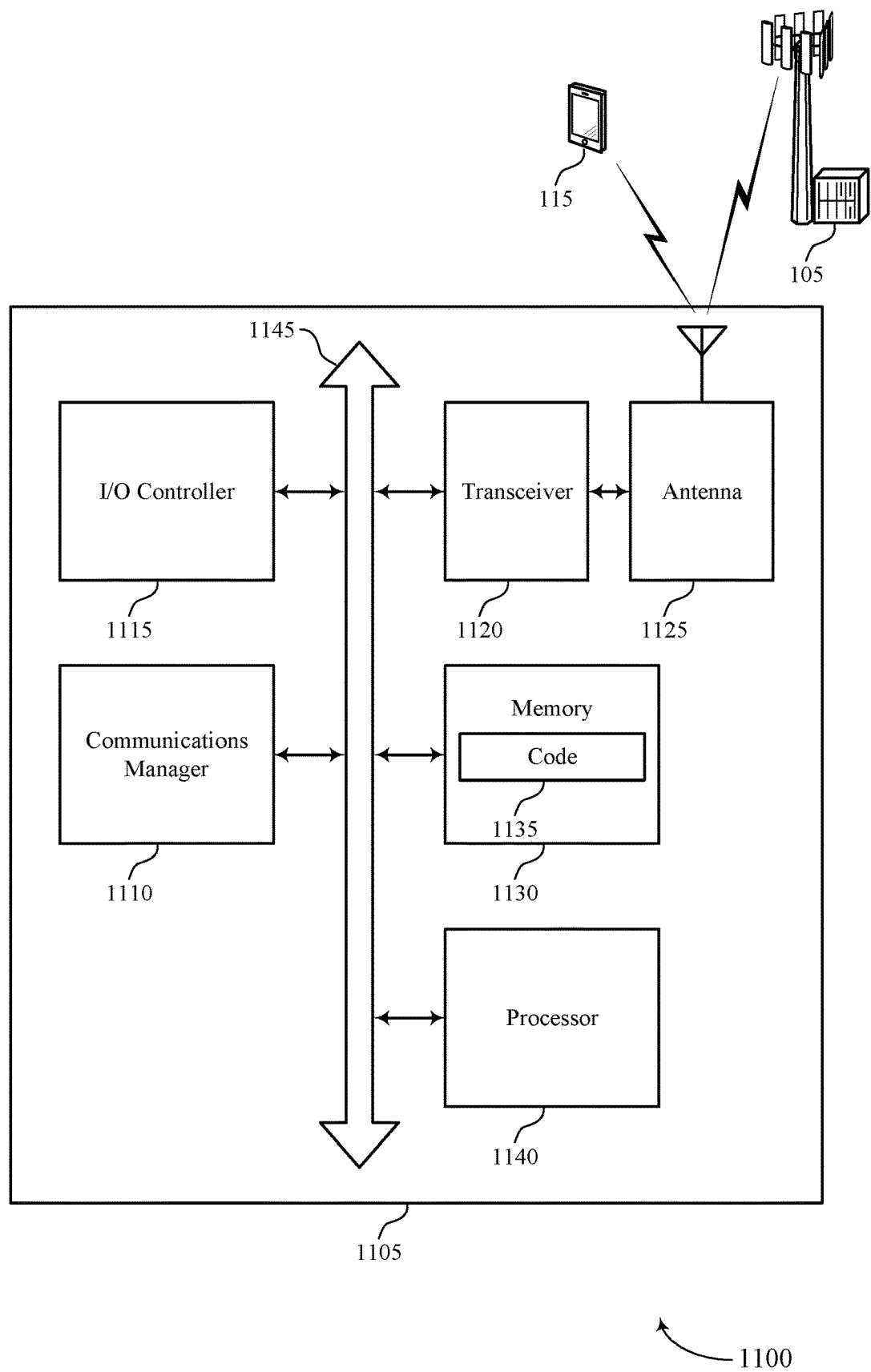
FIG. 11 shows a diagram of a system including a device that supports uplink collision handling in accordance with aspects of the present disclosure.

FIG. 11 shows a diagram of a system 1100 including a device 1105 that supports uplink collision handling in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify first uplink information associated with a first priority level for transmission to a base station, identify second uplink information associated with a second priority level for transmission to the base station, determine a first set of time resources for transmission of the first uplink information and a second set of time resources for transmission of the second uplink information, determine a collision resolution configuration for transmission of the first uplink information and the second uplink information based on the first priority level and the second priority level, and transmit at least a portion of the first uplink information or the second uplink information according to the collision resolution configuration via at least a portion of the first and second sets of time resources.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the wireless device may include a single antenna 1125. However, in some cases, the device may have more than one antenna 1125, which may be capable of concurrently transmitting or receiving multiple wireless transmissions.

The memory 1130 may include random access memory (RAM) and read only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting uplink collision handling).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
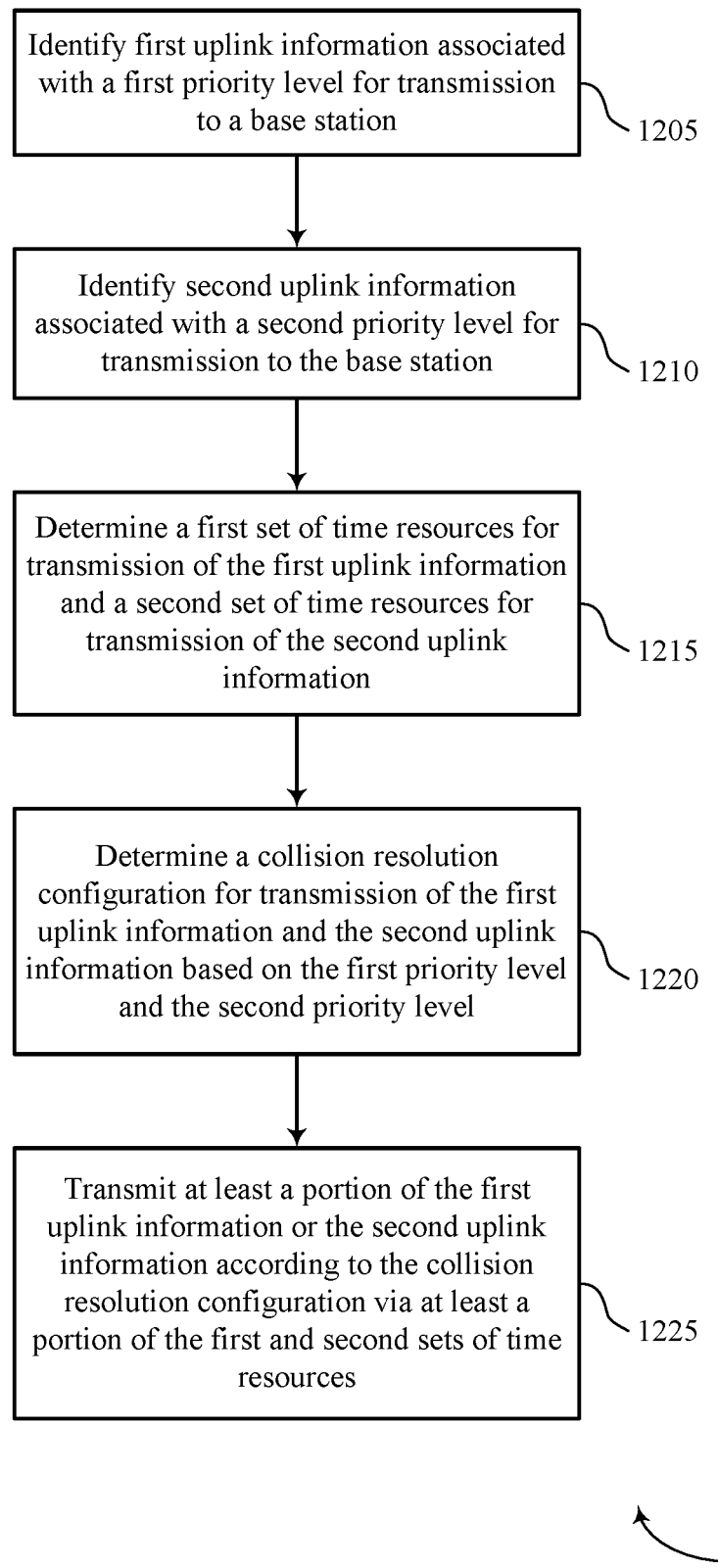
FIGS. 12 through 17 show flowcharts illustrating methods that support uplink collision handling in accordance with aspects of the present disclosure.

FIG. 12 shows a flowchart illustrating a method 1200 that supports uplink collision handling in accordance with aspects of the present disclosure. The operations of method 1200 may be implemented by a UE 115 or its components as described herein. For example, the operations of method 1200 may be performed by a communications manager as described with reference to FIGS. 8 through 11. In some examples, a UE may execute a set of instructions to control the functional elements of the UE to perform the functions described herein. Additionally, or alternatively, a UE may perform aspects of the functions described herein using special-purpose hardware.

At 1205, the UE may identify first uplink information associated with a first priority level for transmission to a base station. The operations of 1205 may be performed according to the methods described herein. In some examples, aspects of the operations of 1205 may be performed by an uplink information component as described with reference to FIGS. 8 through 11.

At 1210, the UE may identify second uplink information associated with a second priority level for transmission to the base station. The operations of 1210 may be performed according to the methods described herein. In some examples, aspects of the operations of 1210 may be performed by an uplink information component as described with reference to FIGS. 8 through 11.

At 1215, the UE may determine a first set of time resources for transmission of the first uplink information and a second set of time resources for transmission of the second uplink information. The operations of 1215 may be performed according to the methods described herein. In some examples, aspects of the operations of 1215 may be performed by a resource manager as described with reference to FIGS. 8 through 11.

At 1220, the UE may determine a collision resolution configuration for transmission of the first uplink information and the second uplink information based on the first priority level and the second priority level. The operations of 1220 may be performed according to the methods described herein. In some examples, aspects of the operations of 1220 may be performed by a collision handler as described with reference to FIGS. 8 through 11.

At 1225, the UE may transmit at least a portion of the first uplink information or the second uplink information according to the collision resolution configuration via at least a portion of the first and second sets of time resources. The operations of 1225 may be performed according to the methods described herein. In some examples, aspects of the operations of 1225 may be performed by a transmission component as described with reference to FIGS. 8 through 11.

Figure 13:
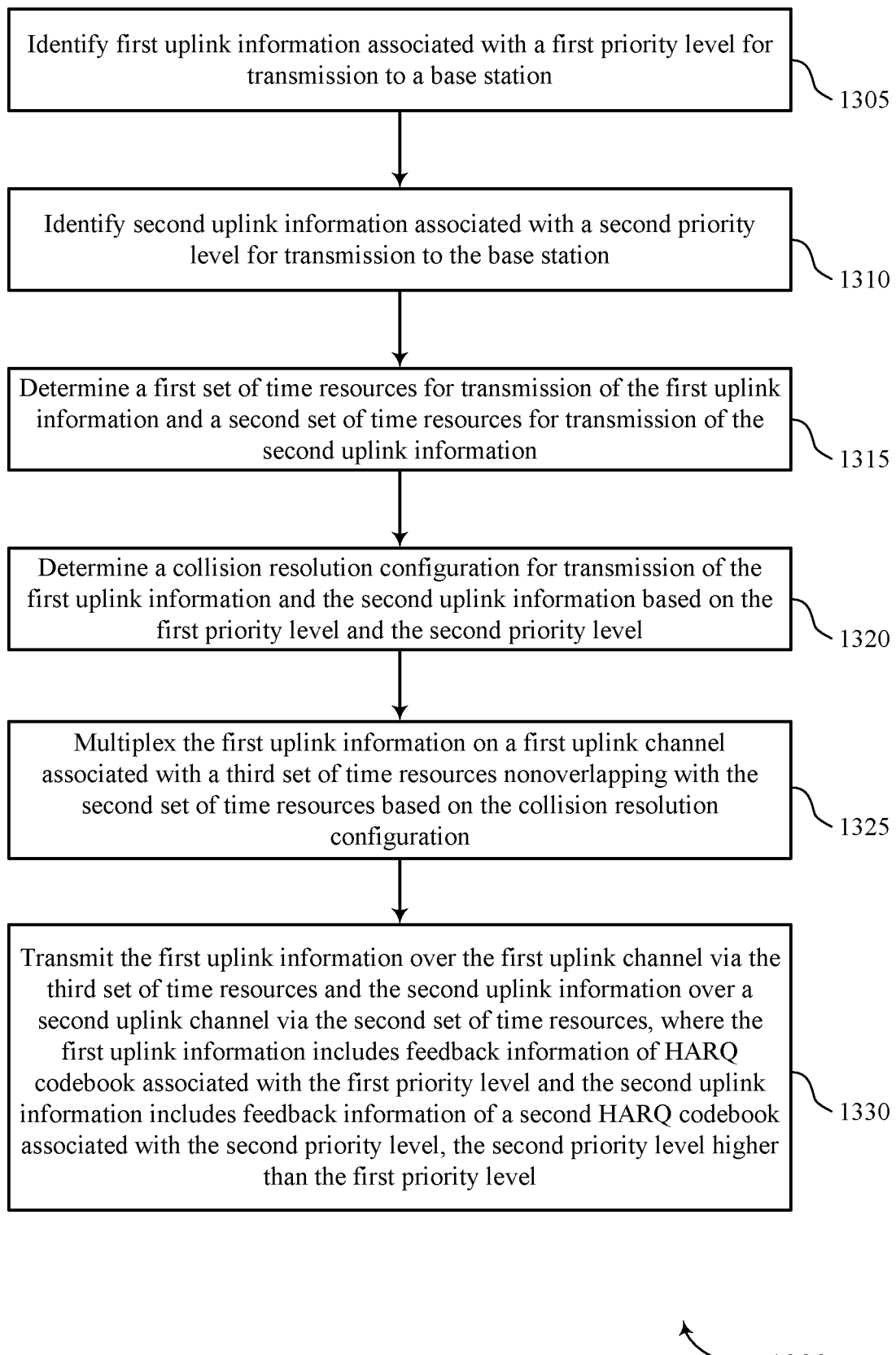

FIG. 13 shows a flowchart illustrating a method 1300 that supports uplink collision handling in accordance with aspects of the present disclosure. The operations of method 1300 may be implemented by a UE 115 or its components as described herein. For example, the operations of method 1300 may be performed by a communications manager as described with reference to FIGS. 8 through 11. In some examples, a UE may execute a set of instructions to control the functional elements of the UE to perform the functions described herein. Additionally, or alternatively, a UE may perform aspects of the functions described herein using special-purpose hardware.

At 1305, the UE may identify first uplink information associated with a first priority level for transmission to a base station. The operations of 1305 may be performed according to the methods described herein. In some examples, aspects of the operations of 1305 may be performed by an uplink information component as described with reference to FIGS. 8 through 11.

At 1310, the UE may identify second uplink information associated with a second priority level for transmission to the base station. The operations of 1310 may be performed according to the methods described herein. In some examples, aspects of the operations of 1310 may be performed by an uplink information component as described with reference to FIGS. 8 through 11.

At 1315, the UE may determine a first set of time resources for transmission of the first uplink information and a second set of time resources for transmission of the second uplink information. The operations of 1315 may be performed according to the methods described herein. In some examples, aspects of the operations of 1315 may be performed by a resource manager as described with reference to FIGS. 8 through 11.

At 1320, the UE may determine a collision resolution configuration for transmission of the first uplink information and the second uplink information based on the first priority level and the second priority level. The operations of 1320 may be performed according to the methods described herein. In some examples, aspects of the operations of 1320 may be performed by a collision handler as described with reference to FIGS. 8 through 11.

At 1325, the UE may multiplex the first uplink information on a first uplink channel associated with a third set of time resources nonoverlapping with the second set of time resources based on the collision resolution configuration. The operations of 1325 may be performed according to the methods described herein. In some examples, aspects of the operations of 1325 may be performed by a multiplexing manager as described with reference to FIGS. 8 through 11.

At 1330, the UE may transmit the first uplink information over the first uplink channel via the third set of time resources and the second uplink information over a second uplink channel via the second set of time resources, where the first uplink information includes feedback information of a first HARQ codebook associated with the first priority level and the second uplink information includes feedback information of a second HARQ codebook associated with the second priority level, the second priority level higher than the first priority level. The operations of 1330 may be performed according to the methods described herein. In some examples, aspects of the operations of 1330 may be performed by a transmission component as described with reference to FIGS. 8 through 11.

Figure 14:
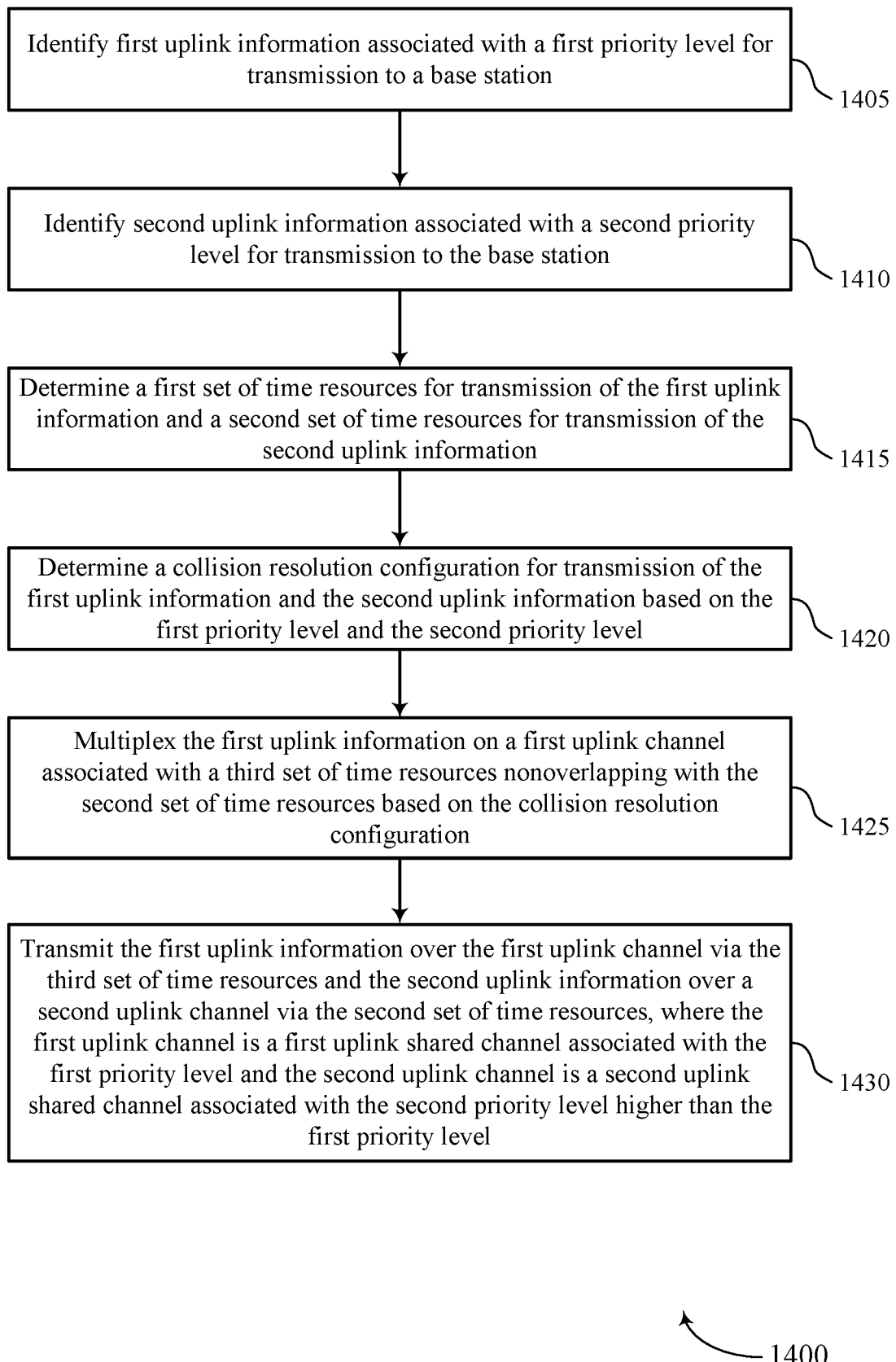

FIG. 14 shows a flowchart illustrating a method 1400 that supports uplink collision handling in accordance with aspects of the present disclosure. The operations of method 1400 may be implemented by a UE 115 or its components as described herein. For example, the operations of method 1400 may be performed by a communications manager as described with reference to FIGS. 8 through 11. In some examples, a UE may execute a set of instructions to control the functional elements of the UE to perform the functions described herein. Additionally, or alternatively, a UE may perform aspects of the functions described herein using special-purpose hardware.

At 1405, the UE may identify first uplink information associated with a first priority level for transmission to a base station. The operations of 1405 may be performed according to the methods described herein. In some examples, aspects of the operations of 1405 may be performed by an uplink information component as described with reference to FIGS. 8 through 11.

At 1410, the UE may identify second uplink information associated with a second priority level for transmission to the base station. The operations of 1410 may be performed according to the methods described herein. In some examples, aspects of the operations of 1410 may be performed by an uplink information component as described with reference to FIGS. 8 through 11.

At 1415, the UE may determine a first set of time resources for transmission of the first uplink information and a second set of time resources for transmission of the second uplink information. The operations of 1415 may be performed according to the methods described herein. In some examples, aspects of the operations of 1415 may be performed by a resource manager as described with reference to FIGS. 8 through 11.

At 1420, the UE may determine a collision resolution configuration for transmission of the first uplink information and the second uplink information based on the first priority level and the second priority level. The operations of 1420 may be performed according to the methods described herein. In some examples, aspects of the operations of 1420 may be performed by a collision handler as described with reference to FIGS. 8 through 11.

At 1425, the UE may multiplex the first uplink information on a first uplink channel associated with a third set of time resources nonoverlapping with the second set of time resources based on the collision resolution configuration. The operations of 1425 may be performed according to the methods described herein. In some examples, aspects of the operations of 1425 may be performed by a multiplexing manager as described with reference to FIGS. 8 through 11.

At 1430, the UE may transmit the first uplink information over the first uplink channel via the third set of time resources and the second uplink information over a second uplink channel via the second set of time resources, where the first uplink channel is a first uplink shared channel associated with the first priority level and the second uplink channel is a second uplink shared channel associated with the second priority level higher than the first priority level. The operations of 1430 may be performed according to the methods described herein. In some examples, aspects of the operations of 1430 may be performed by a transmission component as described with reference to FIGS. 8 through 11.

Figure 15:
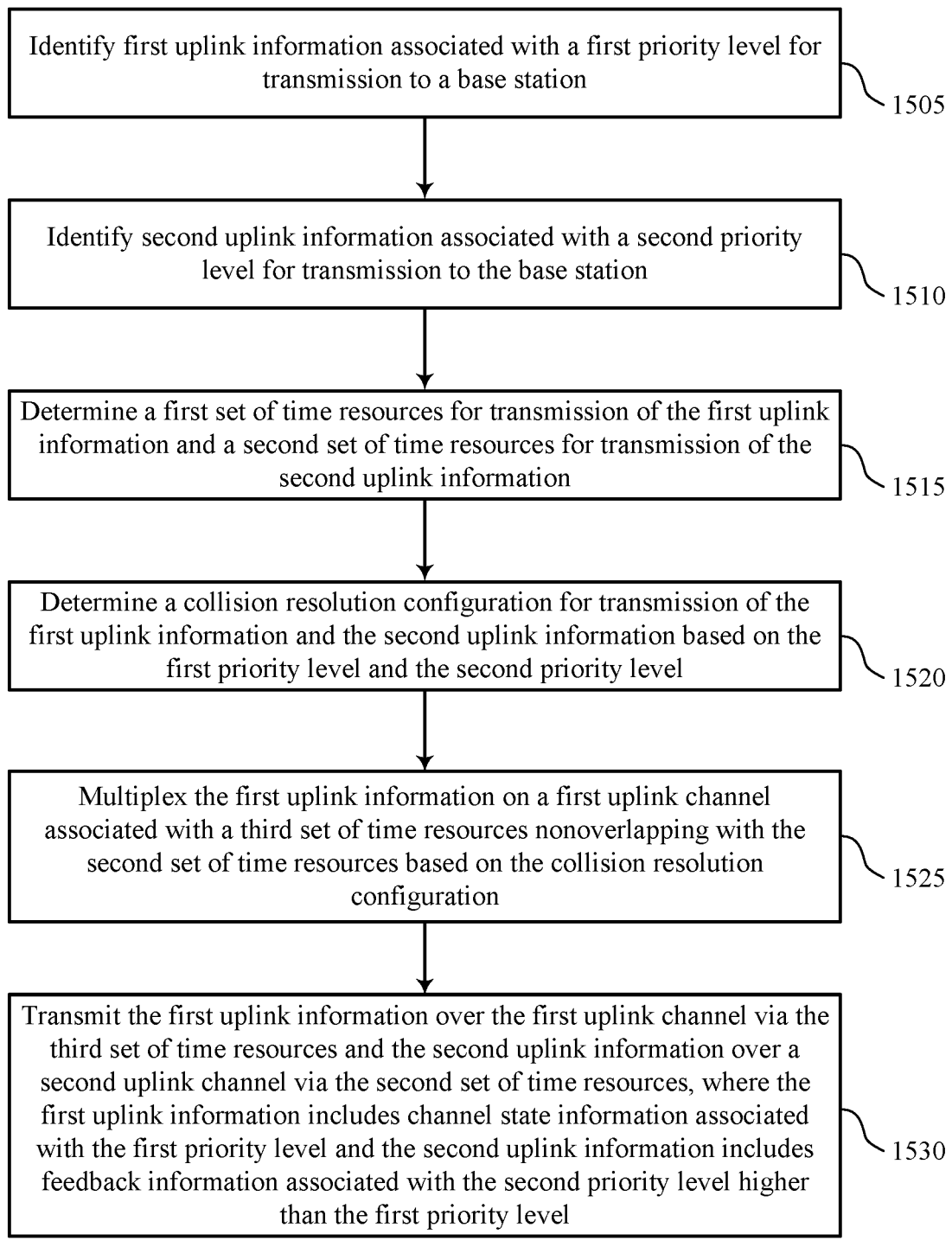

FIG. 15 shows a flowchart illustrating a method 1500 that supports uplink collision handling in accordance with aspects of the present disclosure. The operations of method 1500 may be implemented by a UE 115 or its components as described herein. For example, the operations of method 1500 may be performed by a communications manager as described with reference to FIGS. 8 through 11. In some examples, a UE may execute a set of instructions to control the functional elements of the UE to perform the functions described herein. Additionally, or alternatively, a UE may perform aspects of the functions described herein using special-purpose hardware.

At 1505, the UE may identify first uplink information associated with a first priority level for transmission to a base station. The operations of 1505 may be performed according to the methods described herein. In some examples, aspects of the operations of 1505 may be performed by an uplink information component as described with reference to FIGS. 8 through 11.

At 1510, the UE may identify second uplink information associated with a second priority level for transmission to the base station. The operations of 1510 may be performed according to the methods described herein. In some examples, aspects of the operations of 1510 may be performed by an uplink information component as described with reference to FIGS. 8 through 11.

At 1515, the UE may determine a first set of time resources for transmission of the first uplink information and a second set of time resources for transmission of the second uplink information. The operations of 1515 may be performed according to the methods described herein. In some examples, aspects of the operations of 1515 may be performed by a resource manager as described with reference to FIGS. 8 through 11.

At 1520, the UE may determine a collision resolution configuration for transmission of the first uplink information and the second uplink information based on the first priority level and the second priority level. The operations of 1520 may be performed according to the methods described herein. In some examples, aspects of the operations of 1520 may be performed by a collision handler as described with reference to FIGS. 8 through 11.

At 1525, the UE may multiplex the first uplink information on a first uplink channel associated with a third set of time resources nonoverlapping with the second set of time resources based on the collision resolution configuration. The operations of 1525 may be performed according to the methods described herein. In some examples, aspects of the operations of 1525 may be performed by a multiplexing manager as described with reference to FIGS. 8 through 11.

At 1530, the UE may transmit the first uplink information over the first uplink channel via the third set of time resources and the second uplink information over a second uplink channel via the second set of time resources, where the first uplink information includes channel state information associated with the first priority level and the second uplink information includes feedback information associated with the second priority level higher than the first priority level. The operations of 1530 may be performed according to the methods described herein. In some examples, aspects of the operations of 1530 may be performed by a transmission component as described with reference to FIGS. 8 through 11.

Figure 16:
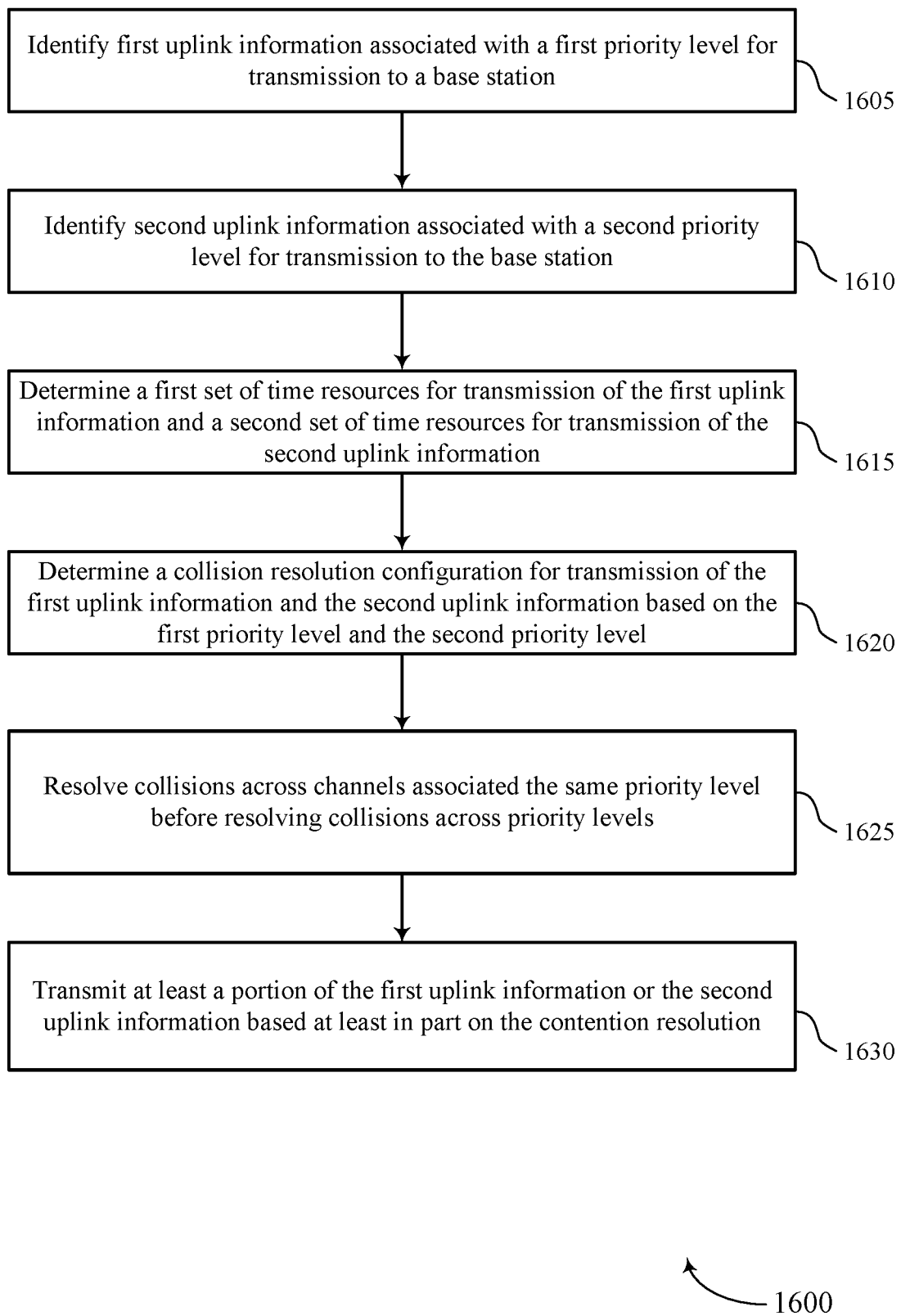

FIG. 16 shows a flowchart illustrating a method 1600 that supports uplink collision handling in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described herein. Additionally, or alternatively, a UE may perform aspects of the functions described herein using special-purpose hardware.

At 1605, the UE may identify first uplink information associated with a first priority level for transmission to a base station. The operations of 1605 may be performed according to the methods described herein. In some examples, aspects of the operations of 1605 may be performed by an uplink information component as described with reference to FIGS. 8 through 11.

At 1610, the UE may identify second uplink information associated with a second priority level for transmission to the base station. The operations of 1610 may be performed according to the methods described herein. In some examples, aspects of the operations of 1610 may be performed by an uplink information component as described with reference to FIGS. 8 through 11.

At 1615, the UE may determine a first set of time resources for transmission of the first uplink information and a second set of time resources for transmission of the second uplink information. The operations of 1615 may be performed according to the methods described herein. In some examples, aspects of the operations of 1615 may be performed by a resource manager as described with reference to FIGS. 8 through 11.

At 1620, the UE may determine a collision resolution configuration for transmission of the first uplink information and the second uplink information based on the first priority level and the second priority level. The operations of 1620 may be performed according to the methods described herein. In some examples, aspects of the operations of 1620 may be performed by a collision handler as described with reference to FIGS. 8 through 11.

At 1625, the UE may resolve collisions across channels associated the same priority level before resolving collisions across priority levels. The operations of 1625 may be performed according to the methods described herein. In some examples, aspects of the operations of 1625 may be performed by a collision handler as described with reference to FIGS. 8 through 11.

At 1630, the UE may transmit at least a portion of the first uplink information or the second uplink information based at least in part on the contention resolution performed at 1625. The operations of 1630 may be performed according to the methods described herein. In some examples, aspects of the operations of 1630 may be performed by a transmission component as described with reference to FIGS. 8 through 11.

Figure 17:
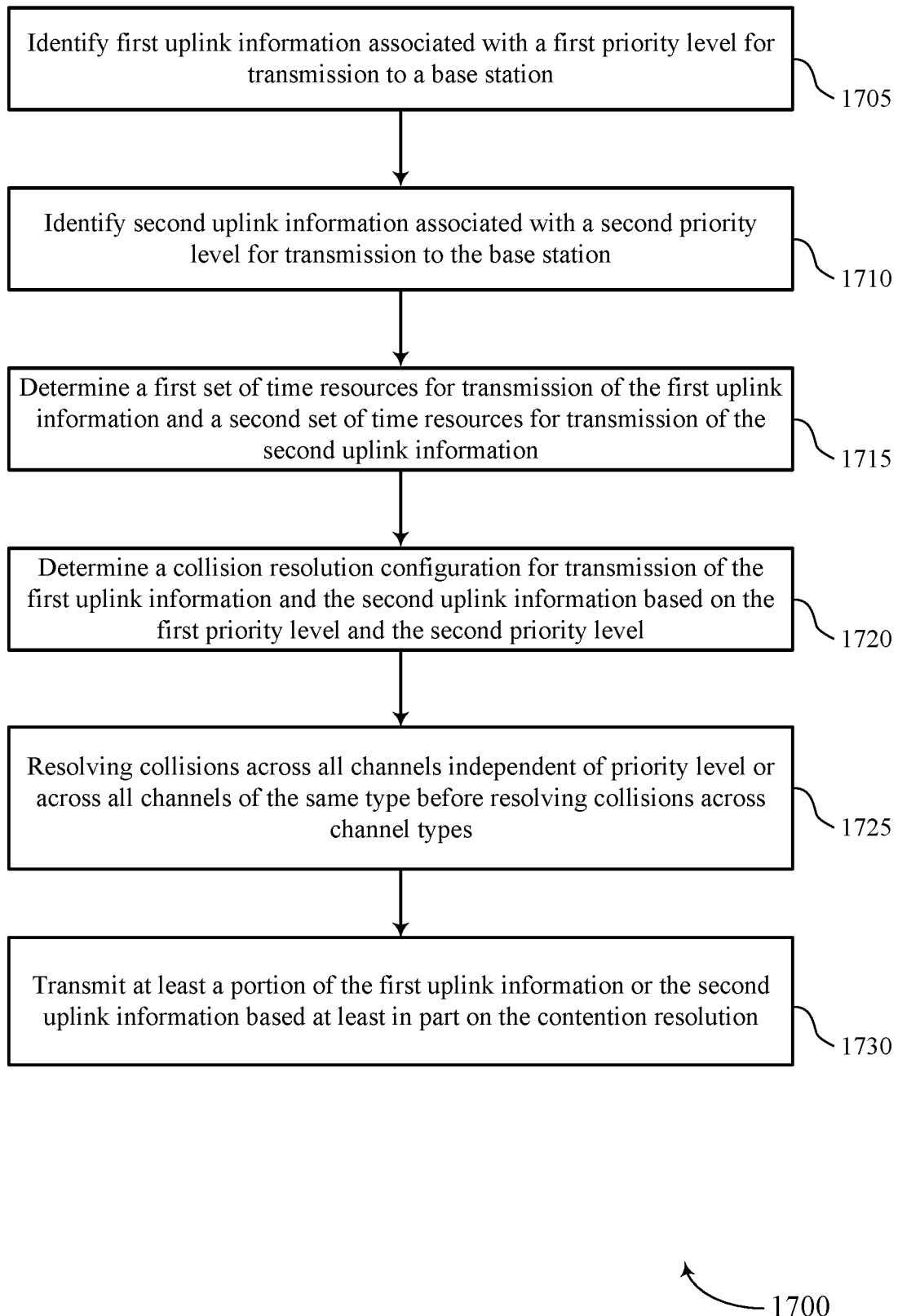

FIG. 17 shows a flowchart illustrating a method 1700 that supports uplink collision handling in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described herein. Additionally, or alternatively, a UE may perform aspects of the functions described herein using special-purpose hardware.

At 1705, the UE may identify first uplink information associated with a first priority level for transmission to a base station. The operations of 1705 may be performed according to the methods described herein. In some examples, aspects of the operations of 1705 may be performed by an uplink information component as described with reference to FIGS. 8 through 11.

At 1710, the UE may identify second uplink information associated with a second priority level for transmission to the base station. The operations of 1710 may be performed according to the methods described herein. In some examples, aspects of the operations of 1710 may be performed by an uplink information component as described with reference to FIGS. 8 through 11.

At 1715, the UE may determine a first set of time resources for transmission of the first uplink information and a second set of time resources for transmission of the second uplink information. The operations of 1715 may be performed according to the methods described herein. In some examples, aspects of the operations of 1715 may be performed by a resource manager as described with reference to FIGS. 8 through 11.

At 1720, the UE may determine a collision resolution configuration for transmission of the first uplink information and the second uplink information based on the first priority level and the second priority level. The operations of 1720 may be performed according to the methods described herein. In some examples, aspects of the operations of 1720 may be performed by a collision handler as described with reference to FIGS. 8 through 11.

At 1725, the UE may resolve collisions across all channels independent of priority level or across all channels of the same type before resolving collisions across channel types. The operations of 1725 may be performed according to the methods described herein. In some examples, aspects of the operations of 1725 may be performed by a collision handler as described with reference to FIGS. 8 through 11.

At 1730, the UE may transmit at least a portion of the first uplink information or the second uplink information based at least in part on the contention resolution performed at 1725. The operations of 1730 may be performed according to the methods described herein. In some examples, aspects of the operations of 1730 may be performed by a transmission component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   determining a first priority level associated with first uplink information based at least in part on a type of channel state information report for the first uplink information, wherein the type of channel state information report is classified according to a time-based resource allocation for transmission of the first uplink information;
   determining a collision resolution configuration for transmission of the first uplink information based at least in part on the first priority level, wherein the collision resolution configuration comprises resolving collisions across channels associated with a same priority level before resolving collisions across priority levels; and
   transmitting the first uplink information in accordance with the time-based resource allocation and the collision resolution configuration.

2. The method of claim 1, wherein determining the first priority level comprises:
   determining that the type of channel state information report comprises a periodic channel state information report; and
   determining that the first priority level is lower than a priority level of a second channel based at least in part on the type of channel state information report comprising the periodic channel state information report.

3. The method of claim 1, wherein determining the first priority level comprises:
   determining that the type of channel state information report comprises a semi-persistent channel state information report included in an uplink control channel; and
   determining that the first priority level is lower than a priority level of a second channel based at least in part on the type of channel state information report comprising the semi-persistent channel state information report included in the uplink control channel.

4. The method of claim 1, wherein determining the first priority level comprises:
   receiving an uplink grant scheduling an uplink shared channel;
   determining that the type of channel state information report comprises an aperiodic channel state information report scheduled by the uplink grant for transmission on the uplink shared channel; and
   determining that the first priority level is the same as a priority level indicated by the uplink grant for the uplink shared channel.

5. The method of claim 4, further comprising:
   multiplexing aperiodic channel state information associated with the aperiodic channel state information report with other uplink control information also associated with the first priority level; and
   transmitting the multiplexed aperiodic channel state information and other uplink control information via the uplink shared channel.

6. The method of claim 1, wherein determining the first priority level comprises:
   receiving an uplink grant scheduling an uplink shared channel;
   determining that the type of channel state information report comprises a semi-persistent channel state information report activated by the uplink grant for transmission on the uplink shared channel; and
   determining that the first priority level is the same as a priority level indicated by the uplink grant for the uplink shared channel.

7. The method of claim 1, further comprising:
   determining a second priority level associated with second uplink information based at least in part on a second type of channel state information report for the second uplink information, wherein the second type of channel state information report is classified according to a second time-based resource allocation for transmission of the second uplink information, and wherein a first set of time resources associated with the first uplink information at least partially overlaps with a second set of time resources associated with the second uplink information; and
   dropping, in accordance with the collision resolution configuration, the second uplink information based at least in part on the first set of time resources and the second set of time resources at least partially overlapping and the first priority level being higher than the second priority level.

8. An apparatus for wireless communications at a user equipment (UE), comprising:
   a processor,
   memory coupled with the processor; and
   instructions stored in the memory and executable by the processor to cause the apparatus to:
      determine a first priority level associated with first uplink information based at least in part on a type of channel state information report for the first uplink information, wherein the type of channel state information report is classified according to a time-based resource allocation for transmission of the first uplink information;
      determine a collision resolution configuration for transmission of the first uplink information based at least in part on the first priority level, wherein the collision resolution configuration comprises resolving collisions across channels associated with a same priority level before resolving collisions across priority levels; and
      transmitting the first uplink information in accordance with the time-based resource allocation and the collision resolution configuration.

9. The apparatus of claim 8, wherein the instructions are further executable by the processor to cause the apparatus to:
   determine that the type of channel state information report comprises a periodic channel state information report; and
   determine that the first priority level is lower than a priority level of a second channel based at least in part on the type of channel state information report comprising the periodic channel state information report.

10. The apparatus of claim 8, wherein the instructions are further executable by the processor to cause the apparatus to:
    determine that the type of channel state information report comprises a semi-persistent channel state information report included in an uplink control channel; and
    determine that the first priority level is lower than a priority level of a second channel based at least in part on the type of channel state information report comprising the semi-persistent channel state information report included in the uplink control channel.

11. The apparatus of claim 8, wherein the instructions are further executable by the processor to cause the apparatus to:

receive an uplink grant scheduling an uplink shared channel;
determine that the type of channel state information report comprises an aperiodic channel state information report scheduled by the uplink grant for transmission on the uplink shared channel; and
determine that the first priority level is the same as a priority level indicated by the uplink grant for the uplink shared channel.

12. The apparatus of claim 11, wherein the instructions are further executable by the processor to cause the apparatus to:
multiplex aperiodic channel state information associated with the aperiodic channel state information report with other uplink control information also associated with the first priority level; and
transmit the multiplexed aperiodic channel state information and other uplink control information via the uplink shared channel.

13. An apparatus for wireless communications at a user equipment (UE), comprising:
means for determining a first priority level associated with first uplink information based at least in part on a type of channel state information report for the first uplink information, wherein the type of channel state information report is classified according to a time-based resource allocation for transmission of the first uplink information;
means for determining a collision resolution configuration for transmission of the first uplink information based at least in part on the first priority level, wherein the collision resolution configuration comprises resolving collisions across channels associated with a same priority level before resolving collisions across priority levels; and
means for transmitting the first uplink information in accordance with the time-based resource allocation and the collision resolution configuration.

14. The apparatus of claim 13, wherein the means for determining the first priority level comprises:
means for determining that the first uplink information comprises a periodic channel state information report; and
means for determining that the first priority level is lower than a priority level of a second channel based at least in part on the type of channel state information report comprising the periodic channel state information report.

15. The apparatus of claim 13, wherein the means for determining the first priority level comprises:
means for determining that the type of channel state information report comprises a semi-persistent channel state information report included in an uplink control channel; and
means for determining that the first priority level is lower than a priority level of a second channel based at least in part on the type of channel state information report comprising the semi-persistent channel state information report included in the uplink control channel.

16. The apparatus of claim 13, wherein the means for determining the first priority level comprises:
means for receiving an uplink grant scheduling an uplink shared channel;
means for determining that the type of channel state information report comprises an aperiodic channel state information report scheduled by the uplink grant for transmission on the uplink shared channel; and
means for determining that the first priority level is the same as a priority level indicated by the uplink grant for the uplink shared channel.

17. The apparatus of claim 16, further comprising:
means for multiplexing aperiodic channel state information associated with the aperiodic channel state information report with other uplink control information also associated with the first priority level; and
means for transmitting the multiplexed aperiodic channel state information and other uplink control information via the uplink shared channel.

18. The apparatus of claim 13, wherein the means for determining the first priority level comprises:
means for receiving an uplink grant scheduling an uplink shared channel;
means for determining that the type of channel state information report comprises a semi-persistent channel state information report activated by the uplink grant for transmission on the uplink shared channel; and
means for determining that the first priority level is the same as a priority level indicated by the uplink grant for the uplink shared channel.

19. A non-transitory computer readable medium storing code for wireless communications at a user equipment (UE), the code comprising instructions executable by a processor to cause the UE to:
determine a first priority level associated with first uplink information based at least in part on a type of channel state information report for the first uplink information, wherein the type of channel state information report is classified according to a time-based resource allocation for transmission of the first uplink information;
determine a collision resolution configuration for transmission of the first uplink information based at least in part on the first priority level, wherein the collision resolution configuration comprises resolving collisions across channels associated with a same priority level before resolving collisions across priority levels; and
transmit the first uplink information in accordance with the time-based resource allocation and the collision resolution configuration.

20. The non-transitory computer readable medium of claim 19, wherein the instructions are further executable by the processor to cause the UE to:
determine that the first uplink information comprises a periodic channel state information report; and
determine that the first priority level is lower than a priority level of a second channel based at least in part on the type of channel state information report comprising the periodic channel state information report.

21. The non-transitory computer readable medium of claim 19, wherein the instructions are further executable by the processor to cause the UE to:
determine that the first uplink information comprises a semi-persistent channel state information report included in an uplink control channel; and
determine that the first priority level is lower than a priority level of a second channel based at least in part on the type of channel state information report comprising the semi-persistent channel state information report included in the uplink control channel.

22. The non-transitory computer readable medium of claim 19, wherein the instructions are further executable by the processor to cause the UE to:

receive an uplink grant scheduling an uplink shared channel;

determine that the type of channel state information report comprises an aperiodic channel state information report scheduled by the uplink grant for transmission on the uplink shared channel; and determine that the first priority level is the same as a priority level indicated by the uplink grant for the uplink shared channel.

23. The non-transitory computer readable medium of claim 22, wherein the instructions are further executable by the processor to cause the UE to:

multiplex aperiodic channel state information associated with the aperiodic channel state information report with other uplink control information also associated with the first priority level; and transmit the multiplexed aperiodic channel state information and other uplink control information via the uplink shared channel.

* * * * *